United States Patent [19]

Carpenter et al.

[11] Patent Number: 5,594,180

[45] Date of Patent: Jan. 14, 1997

[54] METHOD AND APPARATUS FOR FAULT DETECTION AND CORRECTION IN CORIOLIS EFFECT MASS FLOWMETERS

[75] Inventors: Brent L. Carpenter, Broomfield; Antonio X. Luna, Longmont, both of Colo.

[73] Assignee: Micro Motion, Inc., Boulder, Colo.

[21] Appl. No.: 289,413

[22] Filed: Aug. 12, 1994

[51] Int. Cl.$^6$ .................................................. G01F 1/84
[52] U.S. Cl. ........................................ 73/861.356; 303/15
[58] Field of Search .................. 73/118.2, 861.38, 73/861.37, 3, 865.9, 64.53, 32 A; 364/510

[56] References Cited

U.S. PATENT DOCUMENTS

| | | | |
|---|---|---|---|
| 3,339,400 | 8/1963 | Banks | 73/580 |
| 4,480,480 | 11/1984 | Scott et al. | 73/769 |
| 4,530,246 | 7/1985 | Pitman et al. | 73/799 |
| 4,821,769 | 4/1989 | Mills et al. | 73/592 |
| 4,823,614 | 4/1989 | Dahlin | 73/861.38 |
| 4,827,430 | 5/1989 | Aid et al. | 364/510 |
| 5,068,800 | 11/1991 | Brook et al. | 364/507 |
| 5,107,441 | 4/1992 | Decker | 364/510 |
| 5,191,789 | 3/1993 | Furuya | 73/118.2 |
| 5,228,327 | 7/1993 | Bruck | 73/3 |
| 5,349,872 | 9/1994 | Kalotay et al. | 73/861.38 |
| 5,423,208 | 6/1995 | Dudek et al. | 73/117.3 |

FOREIGN PATENT DOCUMENTS

| | | |
|---|---|---|
| 0415129 | 3/1991 | European Pat. Off. . |
| 0452711 | 12/1991 | European Pat. Off. . |
| 9012610 | 12/1990 | Germany . |
| 9106946 | 9/1991 | Germany . |
| 4032661 | 4/1992 | Germany . |
| WO89/00679 | 1/1989 | WIPO . |
| WO93/21505 | 10/1993 | WIPO . |

*Primary Examiner*—Richard Chilcot
*Assistant Examiner*—Jewel V. Artis
*Attorney, Agent, or Firm*—Duft, Graziano & Forest, P.C.

[57] ABSTRACT

Apparatus and methods for detecting and correcting various fault conditions in an operating Coriolis effect mass flowmeter. The apparatus of the present invention receives information from an operating Coriolis mass flowmeter and compares the information to threshold signatures representing various fault conditions. When a fault condition is detected, output signals are applied to inform an operator and to control the mass flow rate through the flowmeter to correct the fault condition. Specifically, the methods of the present invention detect the presence of a crack in the flow tubes and stop the flow of material to prevent release of the material through a cracked flow tubes. Other methods of the present invention detect the void fraction of material flowing through the flow tubes, compute a corrected actual mass flow rate, and control the mass flow rate through the flowmeter to compensate for the effects of the void fraction. Signature information relating to threshold values for measured frequency, drive power, temperature and mass flow of the operating flowmeter as well as the slope and curvature of changes in each measured operating parameter are stored in memory within the fault detection apparatus of the present invention.

34 Claims, 11 Drawing Sheets

METHOD AND APPARATUS FOR FAULT DETECTION AND CORRECTION IN CORIOLIS EFFECT MASS FLOWMETERS

FIELD OF THE INVENTION

This invention relates to Coriolis effect mass flowmeters used to measure flow of a material through a pipe or conduit. In particular, this invention relates to detection and correction of various fault conditions which may arise in the operation of a Coriolis effect mass flowmeter.

PROBLEM

It is known to use Coriolis effect mass flowmeters to measure mass flow and other information for materials flowing through a conduit. As disclosed in U.S. Pat. No. 4,491,025 issued to J. E. Smith, et al., of Jan. 1, 1985, and Re. 31,450 to J. E. Smith of Feb. 11, 1982, these flowmeters have one or more flow tubes of a curved configuration. Coriolis effect mass flowmeters having straight flow tubes are also well known as shown in U.S. Pat. No. 4,109,524 issued Aug. 29, 1978 also to J. E. Smith, et al. Each flow tube configuration in a Coriolis mass flowmeter has a set of natural vibration modes, which may be of a simple bending, torsional or coupled type. Each flow conduit is driven to oscillate at resonance in one of these natural modes. The natural vibration modes of the vibrating, material filled system are defined in part by the combined mass of the flow tubes and the material within the flow tubes. Material flows into the flowmeter from a connected conduit on the inlet side of the flowmeter, is directed through the flow tube or tubes, and exits the flowmeter to a conduit connected to its outlet side.

When there is no flow through the flowmeter, all points along the flow tube oscillate with identical phase due to an applied driver force. As material begins to flow, Coriolis accelerations cause each point along the flow tube to have a different phase. The phase on the inlet side of the flow tube lags the driver, while the phase on the outlet side leads the driver. Sensors are placed on the flow tube to produce sinusoidal signals representative of the motion of the flow tube. The phase difference between two sensor signals is proportional to the mass flow rate of material through the flow tube.

A complicating factor in this measurement is that the density of typical process material varies. Changes in density cause the frequencies of the natural vibration modes to vary. Since the flowmeter's control system maintains resonance, the oscillation frequency varies in response. Mass flow rate in this situation is proportional to the ratio of phase difference and oscillation frequency.

The Coriolis flowmeter of U.S. Pat. No. Re. 31,450 avoids the need of measuring both phase difference and oscillation frequency. Phase difference is determined by measuring the time delay between level crossings of two sinusoidal output signals from the flowmeter. When this method is used, the variations in the oscillation frequency cancel, and mass flow rate is proportional to the measured time delay. This measurement method is frequently referred to as a time delay measurement.

In many applications of Coriolis mass flowmeters the material flowing through the flowmeter and flow tubes may be corrosive or under high pressure. A crack in the flow tubes of such a mass flowmeter could release corrosive material. In these applications it is important to minimize the possibility of leakage of the material. One method to minimize such risks is to encase the flowmeter so as to contain any material which may escape in case of a loss of pressure integrity in the flow tubes. This solution presents many additional problems depending on the materials used and the operating pressure levels. The complexity and cost of encasing flow tubes containing corrosive materials, or containing materials at very high pressures can be prohibitive in many applications of Coriolis effect mass flowmeters.

Rather than attempt to contain the flow tubes in case of such a fault, it is preferred to detect the fault condition before the fluid can be released to the surrounding environment. Early detection of such a fault permits the flow of the material to be stopped before leakage occurs. Others have tried to address this problem by monitoring the sound waves emanating from the vibrating tubes (acoustic emission spectroscopy) or by measurement of changes in resistivity of the flow tubes (electronic fingerprint method). Both of these methods can detect cracks in the flow tubes, however they are similarly sensitive to flow tube surface properties such as corrosion. To distinguish the growth of a crack from other surface conditions by use of these methods requires sensitive electronic measurement and skilled interpretation of the measurement results. The complexity of these measurements has rendered these methods of little use in practical commercial applications of flowmeters.

Another problem with prior designs arises when air, or other foreign material, infiltrates the material flowing through a Coriolis effect mass flowmeter. These materials alter the vibrational characteristics of the flowmeter flow tubes in such a manner that the computed mass flow is erroneous. Prior designs neither detect nor correct these errors in mass flow measurements.

SOLUTION

The above and other problems are solved by the present invention which comprises methods and apparatus for detecting various fault conditions in an operating Coriolis effect mass flowmeter as well as methods and apparatus for correcting those detected faults. The present invention provides for the detection of cracks in the flow tubes early enough to permit the flow of the material to be stopped before a release of the flowing material to the surrounding environment. In addition, the present invention permits early detection and correction of other conditions relating to the flowing material which may indicate other types of system failure. Changes in computed mass flow, material density, void fraction, or mass fraction beyond threshold limits may represent system failures in certain applications of mass flowmeters. The present invention comprises methods and apparatus for monitoring the operation of Coriolis effect mass flowmeters to permit early detection of a crack in the flow tubes or the aforementioned system failures. Additionally, the present invention comprises methods and apparatus for controlling the material flow within the flowmeter to correct the detected faults or to stop the flow of material to prevent harmful release of the flowing material.

In a normally operating flowmeter, under static conditions, the drive power required to vibrate the flow tubes and the resulting, resonant vibration frequency of the flow tubes are constant. Changes in the required drive power or resonant frequency of the vibrating flow tubes indicate a change in the conditions in which the flowmeter is operating. The changes in the drive power and resonant frequency are analyzed by the methods and apparatus of the present invention to detect a crack in the flow tubes or other operational anomalies. Each fault detectable by the present invention exhibits a characteristic "signature" in the changes over time of drive power and/or resonant frequency. For example, a change in the mass flow rate of material in the flow tubes can cause a change of the resonant frequency of the flow tubes without a significant change in the required drive power. However, a sudden decrease in resonant frequency of the flow tubes when coupled with an increase in required drive power is indicative of a crack in the flow tubes. Other changes in the operating conditions exhibit similarly recognizable "signatures" in the operating parameters of the flowmeter and are detectable by the present invention as operating faults or anomalies. The "signatures" are defined in terms of threshold values for the drive power and frequency as well as the rate and curvature of changes over time (first and second derivatives with respect to time).

The present invention comprises apparatus for sensing certain operational parameters of a Coriolis effect mass flowmeter including; the drive power required to vibrate the flow tubes and the resonant frequency at which the tubes vibrate in response to the applied drive power. The apparatus of the present invention further comprises output signals for informing an operator of the occurrence of a particular fault condition in the operation of the flowmeter as well as output signals for automatically adjusting or stopping the flow of material through the flowmeter. These latter output signals are applied to control pumps and valves associated with the flow of material in the flowmeter.

The present invention further comprises methods for determining changes in the sensed operational parameters over time. These methods determine the instantaneous values of certain sensed operational parameters as well as the rates of change, (slope and curvature), of each sensed operational parameter. These methods analyze the present values and changes of the sensed operational parameters to determine that a particular fault condition is occurring. Each fault condition detectable by the present invention is recognized by a unique "signature" in the values and changes of the sensed operational parameters. Signature values for the operational parameters which indicate various fault conditions are stored within the apparatus of the present invention. To the extent that the values and changes of the monitored operational parameters match these stored signatures, the aforementioned output signals are generated by the apparatus of the present invention to indicate the occurrence of the related fault condition or to control the material flow through the flowmeter.

In particular, the present invention detects the presence of a crack in the flow tubes of a Coriolis flowmeter. The presence of a crack is recognized by the "signature" decrease in resonant frequency of the vibrating flow tubes coupled with increasing drive power required to vibrate the flow tubes. This early detection of crack faults permits an operator or control circuit to stop the flow or reduce the pressure in the flow tubes so as to prevent harmful leakage of the material flowing in the flowmeter.

The present invention also recognizes operating conditions which may represent faults in some flowmeter applications such as mass flow changes, material density changes, void fraction changes, and mass fraction changes. For example, an increase in resonant frequency coupled with an increase in drive power indicates an increase in void fraction of the material flowing in the flowmeter. In some applications, this may be considered a fault condition indicating that, for example, excess air bubbles or pockets are forming in the flowing material or that the output of the sensor is in error. Output signals provided by the apparatus of the present invention are generated to warn an operator, to automatically stop the flow, or to automatically adjust the mixture of the material flowing in the conduit. Additional output signals are applied to automatically adjust the flow rate of the material to minimize the error for increased void fraction.

In addition to detection of fault conditions, the methods and apparatus of the present invention automatically correct the measured flow rate in the operating flowmeter to account for void fraction or mass fraction in the flowing material. Information stored within the apparatus of the present invention is used to compute the void fraction as a function of the measured values and computed rates of change in vibrating frequency and drive power. This computed void fraction coupled with the measured flow rate is then used to compute an error percentage. The error percentage is applied to the measured mass flow rate to compute a corrected mass flow rate which is used for operator display or automatic flow control as discussed above.

In sum, the present invention provides methods and apparatus for early detection of various fault conditions in the operation of a Coriolis effect mass flowmeter. The present invention provides fault detection and correction with improved reliability and with less complexity than previous methods or apparatus. The present invention also provides methods and apparatus for automatically correcting the mass flow rate based on measured flow rate and computed void fraction.

DETAILED DESCRIPTION OF THE DRAWINGS

Apparatus

Figure 1:
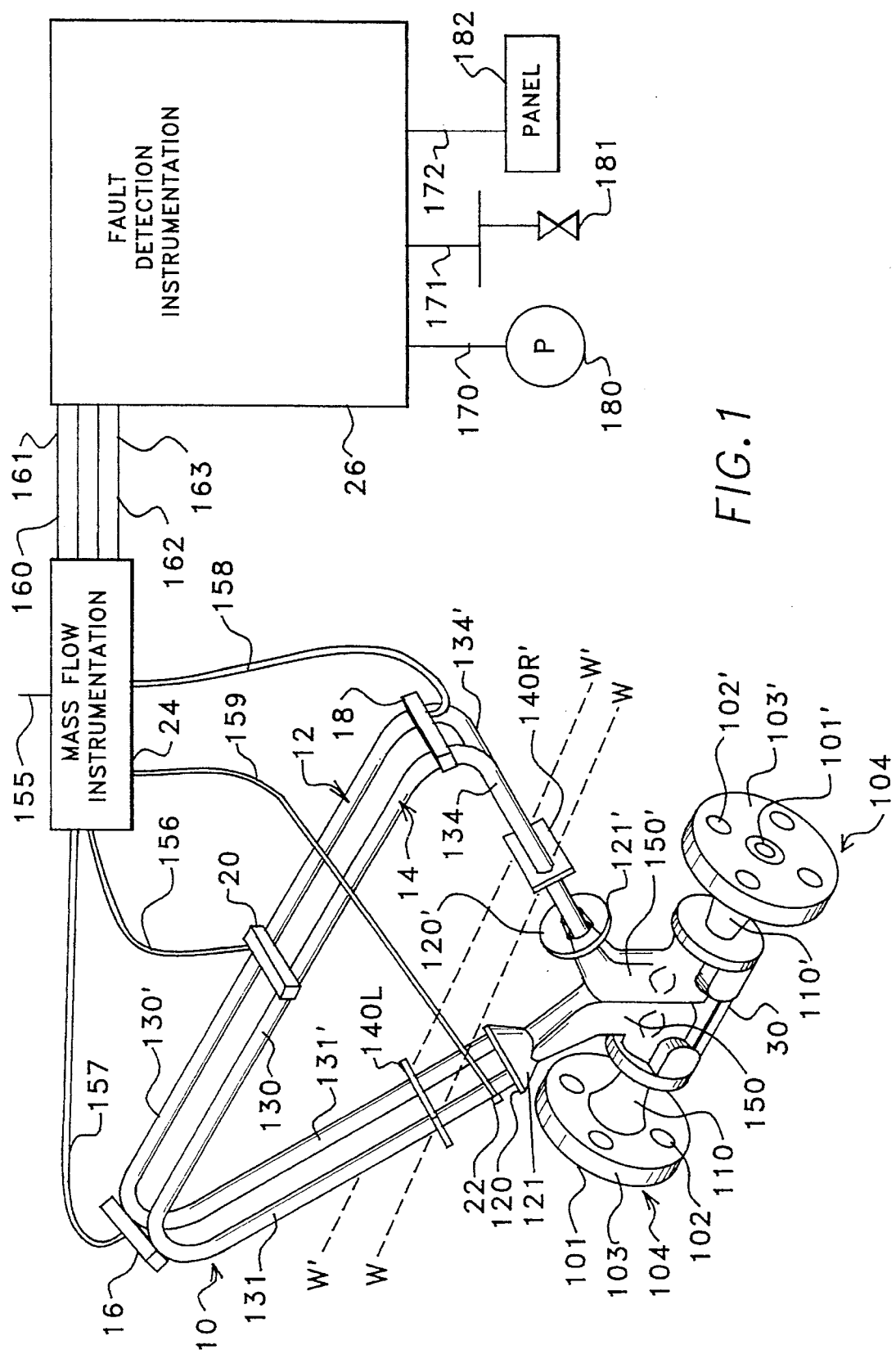
FIG. 1 depicts a typical Coriolis effect mass flowmeter with the fault detection apparatus of the present invention.

A typical Coriolis effect mass flowmeter 10 is illustrated in FIG. 1 as having two cantilever mounted flow tubes 12, 14 affixed to a manifold body 30 so as to have substantially identical spring constants and moments of inertia about their respective out-of-phase bending axes W—W and W'—W'.

A drive coil and magnet 20 are mounted at a midpoint region between the top portion 130 and 130' of flow tubes 12, 14 to oscillate flow tubes 12, 14 out of phase about axes W—W and W'—W'. Left sensor 16 and right sensor 18 are mounted near the respective ends of the top portions of flow tubes 12, 14 to sense the relative movement of flow tubes 12, 14. This sensing may be done in many ways including by measuring the movement of the top ends of the flow tubes 12, 14 through their zero crossings or some other pre-defined point. Flow tubes 12 and 14 have left side legs 131 and 131' and right side legs 134 and 134'. The side legs converge downwardly toward each other and are affixed to surfaces 120 and 120' of manifold elements 121 and 121'. Brace bars 140R and 140L are brazed to the legs of flow tubes 12, 14 and serve to define the axes W—W and W'—W' about which the flow tubes oscillate out of phase when driver 20 is energized over path 156. The position of axes W—W and W-W' is determined by the placement of brace bars 140R and 140L on flow tube side legs 131, 131' and 134, 134'.

Temperature detector 22 is mounted on side leg 131 of flow tube 14 to measure the flow tube's temperature and the approximate temperature of the material flowing therein. This temperature information is used to determine changes in the spring constant of the flow tubes. Driver 20, sensors 16 and 18 and temperature detector 22 are connected to mass flow instrumentation 24 by paths 157, 158 and 159. Mass flow instrumentation 24 may include a microprocessor which processes the signals received from sensors 16, 18, and 22 to determine the mass flow rate of the material flowing through flowmeter 10 as well as other measurements, such as material density and temperature. Mass flow instrumentation 24 also applies a drive signal over path 156 to driver 20 to oscillate tubes 12 and 14 out-of-phase about axes W—W and W'—W'.

Manifold body 30 is formed of casting 150, 150'. Casting elements 150, 150' are attachable to a supply conduit and exit conduit (not shown), by flanges 103, 103'. Manifold body 30 diverts the material flow from the supply conduit into flow tubes 12, 14 and then back into an exit conduit. When manifold flanges 103 and 103' are connected via inlet end 104 and outlet end 104' to a conduit system (not shown), carrying the process material to be measured, the material enters manifold body 30 and manifold element 110 through inlet orifice 101 in flange 103 and is connected by a channel (not shown) having a gradually changing cross-section in casting element 150 to flow tubes 12, 14. The material is divided and routed by manifold element 121 to the left legs 131 and 131' of flow tubes 14 and 12, respectively. The material then flows through the top tubes elements 130, 130' and through the right side legs 134 and 134' and is recombined into a single stream within flow tube manifold element 121'. The fluid is thereafter routed to a channel (not shown) in exit casting element 150' and then to exit manifold element 110'. Exit end 104' is connected by flange 103' having bolt holes 102' to the conduit system (not shown). The material exits through outlet orifice 101' to return to the flow in the conduit system (not shown).

Mass flow instrumentation 24 analyzes signals received on paths 157, 158, and 159 and generates standard output signals on path 155 to indicate mass flow rates utilized by a control system or operator for monitoring and control of the mass flow rate through the associated conduit system (not shown). In addition, mass flow instrumentation 24 generates output signals on paths 160, 161, 162, and 163 indicating present resonant frequency of the flow tubes, present drive power required to drive the flow tubes, present temperature of the flow tubes, and computed mass flow rate, respectively. These signals are received by fault detection instrumentation 26 and analyzed to determine the occurrence of faults in the operation of flowmeter 10. These signals (and others detectable in the operation of flowmeter 10) are hereinafter referred to collectively and individually as "operating parameters".

Mass flow instrumentation 24 comprises standard apparatus and methods known to the art. A Micromotion Remote How Transmitter model number 9739 is exemplary of such a device. Although a signal indicative drive power is not normally provided as an output signal from the model 9739, one skilled in the art would readily recognize that such a signal is available from the 9739 instrument. A frequency signal is commonly available from the model 9739 since the design is such that fluid density is measured. An electronics technician could easily modify such a device to apply appropriate signals indicative of flow tube vibration frequency and required drive power to conductors directed out of the instrument connecting to a fault detection instrumentation 26.

Upon detection of fault conditions, fault detection instrumentation 26 applies signals to pump 180 over path 170 and to valve 181 over path 171 to correct the mass flow rate through flowmeter 10 or to stop the material flow to prevent release of the material. Pump 180 is controlled by fault detection instrumentation 26 to increase or decrease the pressure at inlet orifice 101 of flowmeter 10 to correct a detected fault. Valve 181 is controlled by fault detection instrumentation 26 to increase or decrease backpressure at outlet orifice 101' of flowmeter 10 to correct a detected fault. Fault detection instrumentation 26 also applies signals on path 172 to inform the operator of the occurrence of a fault condition detected in the operation of flowmeter 10. The signals applied to path 172 are messages displayed on panel 182 to inform the operator of the need for manual corrective action or to inform the operator as to the status of corrective control performed by the fault detection instrumentation 26.

For example, fault detection instrumentation 26 determines whether a crack is present in the flow tubes by analyzing the resonant frequency and drive power information received on paths 160 and 161 respectively. If a crack is present in the flow tubes, fault detection instrumentation 26 generates an output signal on path 170 to decrease pressure generated by pump 180 at inlet orifice 101 of flowmeter 10. This slows or stops the flow of material through the flow tubes before the crack results in a loss of pressure integrity thus preventing release of the material from within the flow tubes 12 and 14.

Figure 1A:
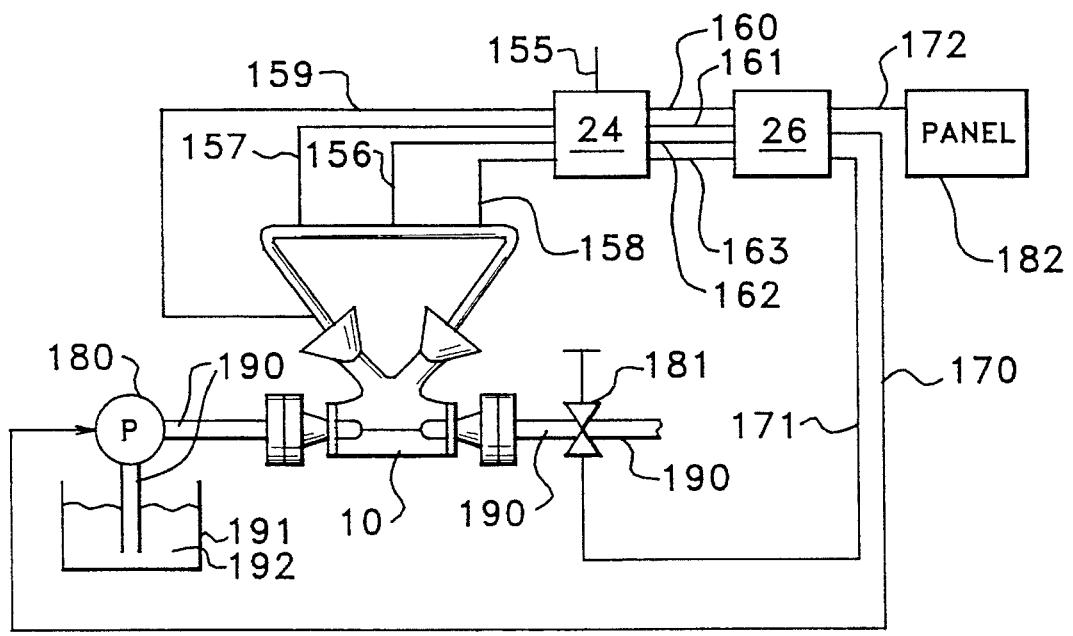
FIG. 1A depicts the Coriolis effect mass flowmeter of FIG. 1 connected to a controllable pump and controllable valve in a typical closed loop control application configuration.

FIG. 1A depicts flowmeter 10 and fault detection instrumentation 26 with pump 180 and valve 181 connected as they would be in a typical application of flowmeter 10. Pump 180 draws material 192 from source 191 and delivers it to the inlet orifice 101 of flowmeter 10 through conduit 190. The inlet pressure created by pump 180 is controlled by fault detection instrumentation 26 by applying signals over path 170 to increase or decrease the speed of pump 180. Material delivered to inlet orifice 101 of flowmeter 10 moves through the meter to outlet orifice 101' into conduit 190 and finally through valve 181 to its destination. The backpressure created by valve 181 is controlled by fault detection instrumentation 26 by applying signals over path 171 to open or close valve 181.

It will be recognized by those skilled in the art that the methods and apparatus of the present invention may be advantageously applied to any configuration of flowmeter. The particular flowmeter configuration discussed above with respect to FIGS. 1 and 1A is exemplary of all such flowmeter configurations. In particular, straight flow tube, U-shaped flow tube, irregular and other configurations of flowmeters may be combined with the methods and apparatus of the present invention for detecting and correcting operating fault conditions.

Figure 2:
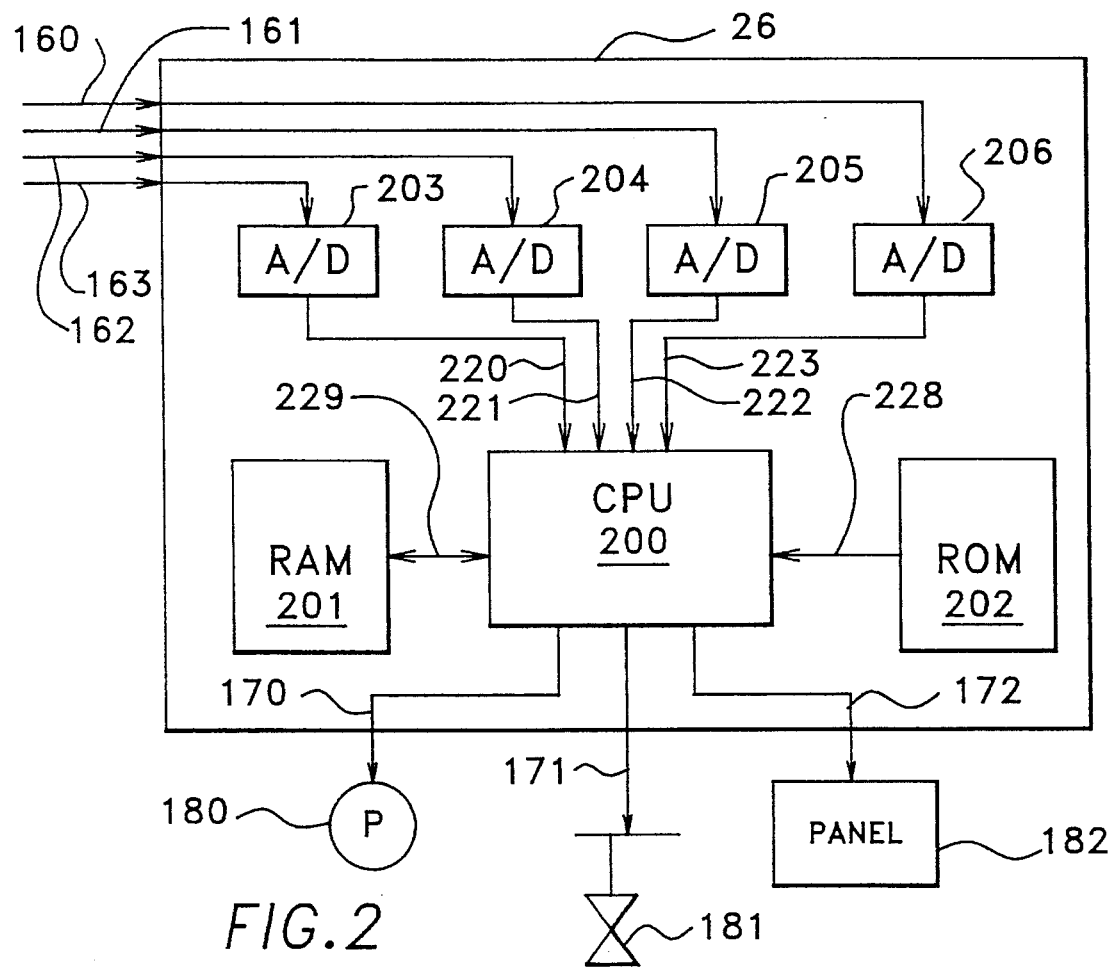
FIG. 2 shows additional detail of the fault detection instrumentation of the present invention.

FIG. 2 shows additional detail of the components within fault detection instrumentation 26. Analog signals applied to paths 160 through 163 by mass flow instrumentation 24 of FIG. 1 are converted to digital values by analog to digital (A/D) converters 203 through 206. Signals representing the converted digital values are applied to paths 220 through 223 for processing by CPU 200. The signals applied to paths 220, 221, 222, and 223 are representative of present resonant frequency of the vibrating flow tubes, present drive power required to vibrate the flow tubes, present temperature of the flow tubes, and computed mass flow, respectively.

CPU 200 periodically samples the digital signals representing present frequency, drive power, temperature, and computed flow rate from paths 220 through 223 respectively. At each periodic sampling, CPU 200 averages multiple readings of the digital values applied to paths 220 through 223 and writes the averaged values in buffers in RAM memory 201 over path 229. This averaging aids in filtering analog signal noise which may be present on paths 160 through 163. Averaged values for frequency, drive power, temperature, and computed flow rate are stored in buffers in RAM memory 201 in a circular manner so that when the buffers are filled the oldest previously stored values are overwritten by the newest values to be stored. The circular buffers contain the values of the stored operating parameters over a period of time.

CPU 200 computes the first and second derivatives with respect to time for each stored operating parameter to determine the slope and curvature of any changes over time in the operation of flowmeter 10 of FIG. 1. CPU 200 reads stored averaged values from RAM memory 201 over path 229. The difference between two averages stored sequentially in time is the slope of the changes in that operating parameter (first derivative of the sampled operating parameter). An example of this computation is described wherein $f_0$ through $f_N$ are presumed to be the stored averages for frequency of flow tube vibrations over N+1 periods of reading by CPU 200 and wherein $S_1$ through $S_N$ are the computed slopes for the changes in the values of $f_0$ through $f_N$ for each sampling period.

$$S_1=(f_1-f_0)$$

Or more generally: $S_x=(f_x-f_{x-1})$ where x=1 through N.

The difference between two such computed slopes indicates the curvature of the operating parameter (second derivative of the sampled operating parameter). An example of this computation is as follows wherein $S_1$ through $S_N$ are presumed to be the slopes of the changes in periodically stored averages as discussed above and wherein $C_2$ through $C_N$ are the computed curvatures for the changes in the slopes $S_1$ through $S_N$.

$$C_2=(S_2-S_1)$$

Or more generally: $C_x=(S_x-S_{x-1})$ where x=2 through N.

ROM memory 202 contains the threshold "signatures" for each fault detectable by the present invention. The information stored in the "signatures" relates to threshold values for present values of operational parameters as well as threshold values for slope and curvature of changes in operational parameters. The information is recorded for each operational fault detectable by the apparatus and methods of the present invention. The "signature" thresholds are unique to the particular characteristics of the flowmeter, the nominal physical properties of the material flowing through the flowmeter, and the nominal flow rates of the material through the flowmeter. These threshold values are predetermined by the user or manufacturer of the flowmeter and programmed into ROM memory 202. In an alternative exemplary embodiment, CPU 200 may copy these values from ROM memory 202 into RAM memory 201 and interact with the operator to modify the threshold "signatures" for a particular customized need in the application of the flowmeter.

ROM memory 202 contains additional information predetermined at time of manufacture or installation of flowmeter 10 pertaining to correction of measured mass flow rate to account for detected changes in material void fraction. As discussed below, increases in void fraction create errors in the measurement of mass flow rate. The error factor (error percentage) may be determined by methods of the present invention utilizing "signature" information which encodes the error percentage as a function of measured mass flow rate and computed void fraction. The "signature" information representing the relationships between measured mass flow rate, computed void fraction, and resultant error percentage is unique to the particular flowmeter 10 and the particular application. This information is stored in ROM memory 202 with the fault detection signatures. The methods of the present invention which utilize this information to correct measured mass flow rate are discussed below.

CPU 200 compares the stored average values of operating parameters, the computed slopes, and the computed curvatures to corresponding threshold values read over path 228 from the "signatures" stored in ROM memory 202. The signature information indicates specific threshold values for the operating parameters, the computed slopes, and the computed curvatures which indicate the occurrence of particular fault conditions in the operation of flowmeter 10 of FIG. 1. CPU 200 compares the signature threshold information read from ROM memory 202 to the corresponding averaged values in RAM for frequency, drive power, temperature, and measured mass flow rate. CPU 200 also compares the signature threshold values in ROM memory 202 to the computed slopes and curvatures for each parameter. These comparisons determines whether each of various fault conditions has occurred in the operation of flowmeter 10 of FIG. 1. The methods applied to make this comparison are discussed below in further detail.

CPU 200 applies signals to path 170 to control the speed of pump 180 and applies signals to path 171 to open or close valve 181 in response to detection of a fault condition. In addition, CPU 200 displays messages on panel 182 over path 172 to inform the operator regarding controls and status of the operation of flowmeter 10. As discussed below, when CPU 200 detects a crack in the flow tubes 12 and 14 of flowmeter 10, it controls pump 180 and valve 181 to stop the flow of material and relieve the pressure within flowmeter 10. Similarly, CPU 200 may modify the flow rate to compensate for other fault conditions such as due to: faulty mass flow, faulty material density, faulty void fraction, or faulty mass fraction. Each of these fault conditions is sensed by CPU 200 by comparison of the signature threshold information stored in ROM memory 202 with present parameter values stored in RAM and computed slopes and curvatures for each parameter as discussed above. Each fault condition is defined by a set of threshold values stored in ROM memory 202. The threshold values relate to the present values of the several operating parameters as well as the slope and curvature of changes in the several operating parameters.

Signature Information Samples

Figure 3:
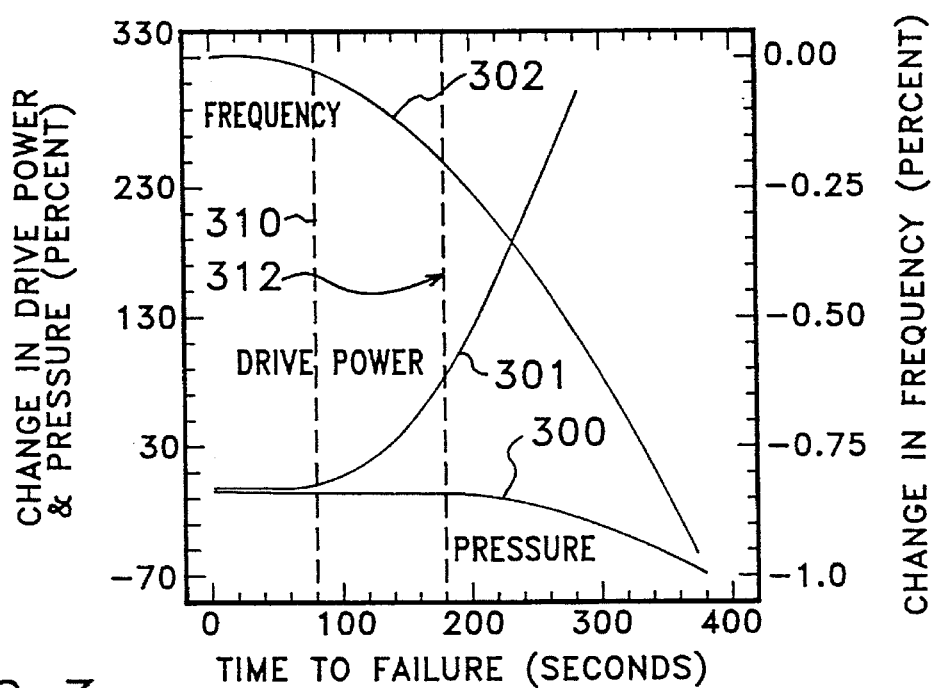
FIG. 3 is a graph which depicts the characteristic signature of the frequency and drive power curves as a function of time with a crack in the flow tubes.

FIG. 3 is a graph depicting typical changes in resonant frequency of the vibrating flow tubes and changes in drive power required to vibrate the flow tubes as a crack forms and grows through the wall of a flow tube. The abscissa of the graph in FIG. 3 is time in seconds. The curve 300 labeled "Pressure" has it's ordinate scale labelled on the left side of the graph. This curve 300 represents the pressure within the flow tubes over time as the crack in the flow tubes grows over time. As can be seen in the graph, pressure within the flow tubes remains constant until time 180 seconds shown by a dashed line labelled 312. Pressure begins to drop at this point due to release of the flow material through the crack in the flow tube walls.

The curve 301 labelled "Drive Power" also has it's ordinate scale labelled on the left side of the graph. Curve 301 represents the drive power required to vibrate the flow tubes at the resonant frequency. The curve 302 labelled "Frequency" has it's ordinate scale labelled on the right side of the graph. Curve 302 represents the change in the resonant frequency of the vibrating flow tubes. The drive power and frequency remain relatively constant as the crack begins to grow through approximately time 80 seconds shown by a dashed line labelled 310. Frequency curve 302 begins to decrease and drive power curve 301 begins to increase at this time. At time 80 seconds labelled 310, CPU 200 may determine that a crack is growing in the flow tubes by matching the frequency decrease and drive power increase with appropriate signature information stored in ROM memory 202. A non-linear increase in the required drive power as exhibited in curve 301 and a non-linear decrease in the resonant frequency as exhibited in curve 302 are signature characteristics of a growing crack in the flow tubes of a flowmeter such as flowmeter 10 of FIG. 1. As can be seen by the relationship of the curves 300, 301, and 302 of FIG. 3, methods of the present invention can detect the formation of a crack in flow tubes 12 or 14 as soon as time 80 seconds (labelled 310), well before the release of pressure from within flow tubes 12 or 14 as indicated by the line labelled 312 at time 180 seconds.

Figure 4:
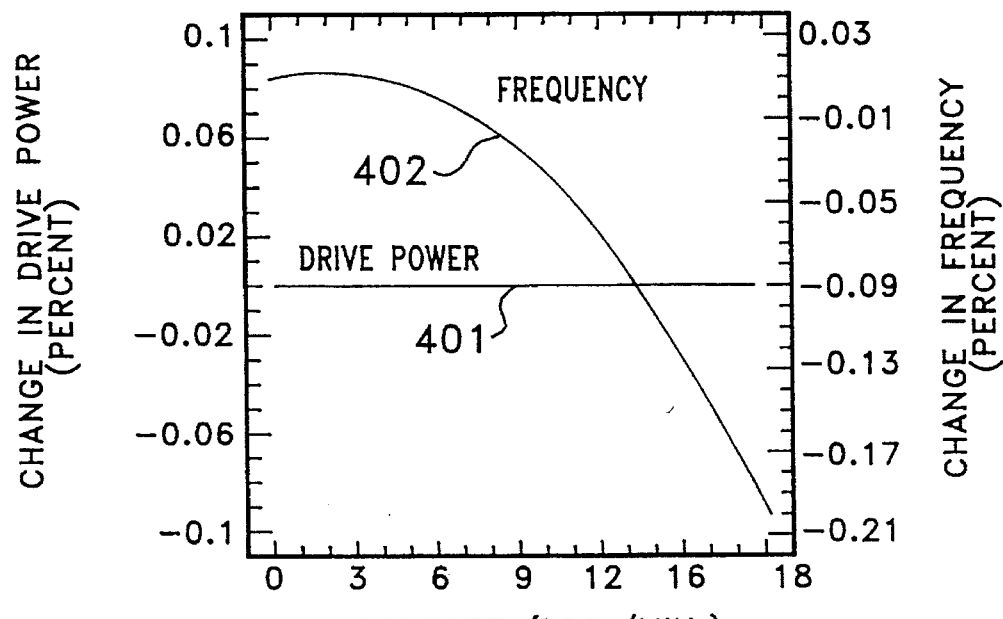
FIG. 4 is a graph which depicts the characteristic signature of the frequency and drive power curves as a function of mass flow rate within the flow tubes.

The signature change in operating parameters of a forming crack fault depicted in FIG. 3 and discussed above is clearly distinguishable from a normally operating flowmeter responding to changes in the mass flow of material (as depicted in FIG. 4). FIG. 4 depicts the signature change in operating parameters of a flowmeter normally responding to changes in material mass flow through the flowmeter. The abscissa of the graph in FIG. 4 is mass flow rate of the material flowing through the flow tubes of a flowmeter such as flowmeter 10 of FIG. 1. The curve 401 labelled "Drive Power" has it's ordinate scale labelled on the left side of the graph. This curve 401 represents the drive power required to vibrate the flow tubes at the resonant frequency. The curve 402 labelled "Frequency" has it's ordinate scale labelled on the right side of the graph. This curve 402 represents the change in the resonant frequency of the vibrating flow tubes. As shown by the curves of FIG. 4, in a normally operating flowmeter, drive power remains constant while mass flow rate increases but resonant frequency decreases while mass flow rate increases. Constant drive power as exhibited in curve 401 and a non-linear decrease in the resonant frequency as exhibited in curve 402 are signature characteristics of an increasing flow rate in the flow tubes of a flowmeter such as flowmeter 10 of FIG. 1. Conversely, a constant drive power coupled with a non-linear increase in resonant frequency indicates a decreasing flow rate in the flow tubes of a flowmeter.

Figure 5:
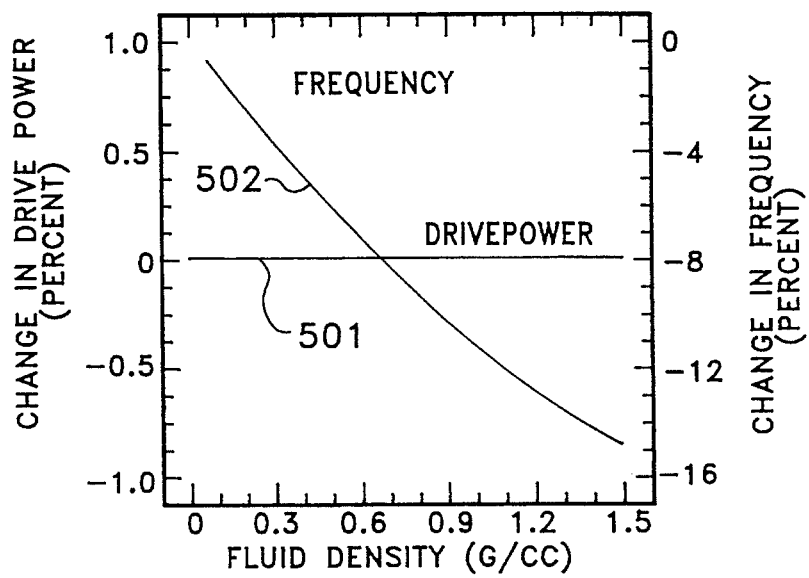
FIG. 5 is a graph which depicts the characteristic signature of the frequency and drive power curves as a function of material density flowing within the flow tubes.

FIG. 5 depicts the signature change in operating parameters of a flowmeter normally responding to changes in density of the material flowing through the flowmeter. The abscissa of the graph in FIG. 5 is the density of the material flowing through the flow tubes of a flowmeter such as flowmeter 10 of FIG. 1. The curve 501 labelled "Drive Power" has it's ordinate scale labelled on the left side of the graph. This curve 501 represents the drive power required to vibrate the flow tubes at the resonant frequency. The curve 502 labelled "Frequency" has it's ordinate scale labelled on the right side of the graph. This curve 502 represents the change in the resonant frequency of the vibrating flow tubes. As shown by the curves of FIG. 5, drive power remains constant while material density increases but resonant frequency decreases while material density increases. Constant drive power as exhibited in curve 501 and a non-linear decrease in the resonant frequency as exhibited in curve 502 are signature characteristics of increasing material density in the flow tubes of a flowmeter such as flowmeter 10 of FIG. 1. Conversely, a constant drive power coupled with a non-linear increase in resonant frequency indicates a decreasing material density in the flow tubes of a flowmeter.

The signature of changing material density as depicted in FIG. 5 is clearly distinguishable from a crack fault discussed above with reference to FIG. 3. The constant drive power exhibited by curve 501 in FIG. 5 is clearly distinguishable by CPU 200 from the positively sloped, increasing drive power of curve 301 of FIG. 3. To distinguish the material density signature of FIG. 5 from the flow rate signature of FIG. 4, CPU 200 detects the negative curvature (second derivative) of frequency curve 402 in FIG. 4 from the positive curvature of frequency curve 502 in FIG. 5. The fault signature information stored in ROM memory 202 for a flow rate fault condition versus a material density fault condition indicates that CPU 200 must compare the curvature (second derivative) of the frequency operating parameter to determine which of the faults has occurred.

Figure 6:
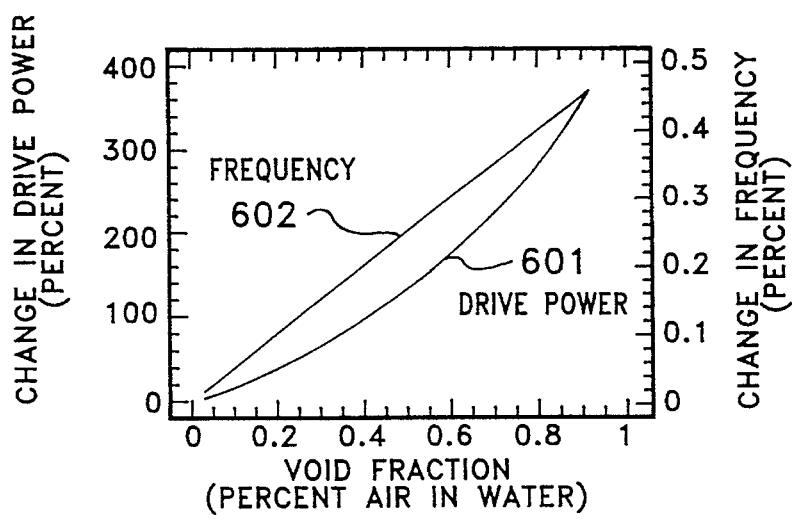
FIG. 6 is a graph which depicts the characteristic signature of the frequency and drive power curves as a function of void fraction or slug flow of the material flowing within the flow tubes.

FIG. 6 depicts the signature change in operating parameters of a flowmeter normally responding to changes in void fraction of the material flowing through the flowmeter. Void fraction is a measure of the air or gas content of the material flowing through the flowmeter. The abscissa of the graph in FIG. 6 is the void fraction of the material flowing through the flow robes of a flowmeter such as flowmeter 10 of FIG. 1. The curve 601 labelled "Drive Power" has it's ordinate scale labelled on the left side of the graph. This curve 601 represents the drive power required to vibrate the flow tubes at their resonant frequency. The curve 602 labelled "Frequency" has it's ordinate scale labelled on the right side of the graph. This curve 602 represents the change in the resonant frequency of the vibrating flow robes. As shown by the curves of FIG. 6, both drive power and resonant frequency increase while void fraction increases. Increasing drive power as exhibited in curve 601 and increasing resonant frequency as exhibited in curve 602 are signature characteristics of increasing void fraction in the flow tubes of a flowmeter such as flowmeter 10 of FIG. 1. Conversely, decreases in both drive power and resonant frequency indicates a decreasing void fraction in the flow tubes of a flowmeter.

Figure 7:
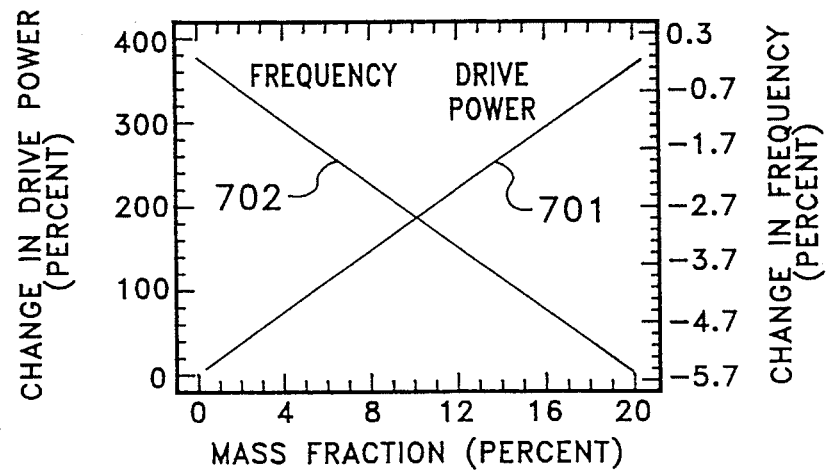
FIG. 7 is a graph which depicts the characteristic signature of the frequency and drive power curves as a function of mass fraction of the material flowing within the flow tubes.

FIG. 7 depicts the signature change in operating parameters of a flowmeter normally responding to changes in mass fraction of the material flowing through the flowmeter. Mass fraction is a measure of the heavier material content in the material flowing through the flowmeter. The abscissa of the graph in FIG. 7 is the mass fraction of the material flowing through the flow tubes of a flowmeter such as flowmeter 10 of FIG. 1. The curve 701 labelled "Drive Power" has it's ordinate scale labelled on the left side of the graph. This curve 701 represents the drive power required to vibrate the flow tubes at the resonant frequency. The curve 702 labelled "Frequency" has it's ordinate scale labelled on the right side of the graph. This curve 702 represents the change in the resonant frequency of the vibrating flow tubes. As shown by the curves of FIG. 7, drive power increases while mass fraction increases and resonant frequency decreases while mass fraction increases. Linearly increasing drive power as exhibited in curve 701 and linear decreasing resonant frequency as exhibited in curve 702 are signature characteristics of increasing mass fraction in the flow tubes of a flowmeter such as flowmeter 10 of FIG. 1. Conversely, linear decreases in drive power and linear increases resonant frequency indicates a decreasing mass fraction in the flow tubes of a flowmeter.

To distinguish the changing mass fraction signature of FIG. 7 from the crack fault signature of FIG. 3, CPU 200 must detect different curvature (second derivative) of the frequency curves 302 in FIG. 3 and 702 in FIG. 7. Alternatively, CPU 200 must detect different curvature (second derivative) of the drive power curves 301 in FIG. 3 and 701 in FIG. 7. The fault signature information stored in ROM memory 202 for a crack fault condition versus a mass fraction fault condition indicates that CPU 200 must compare the curvature (second derivative) of the frequency or drive power operating parameter to determine which of the two faults has occurred.

The precise "signature" threshold values, slopes, and curvatures for the operational parameters which indicate a particular fault are unique to each particular flowmeter and the nominal material composition, flow rate, and pressures within the flowmeter. The particular signature values are determined by testing at time of manufacture and stored in ROM memory 202. One skilled in the art will readily recognize that the signature threshold values may be copied to RAM memory 201 by CPU 200 and then modified to customize for a particular application of the flowmeter.

The ordinate scales of FIGS. 3 through 7 are expressed in percent change in the operational parameter. One skilled in the art will recognize that the threshold information may be equivalently expressed either as a percent change or as absolute threshold values. The methods of the present invention discussed below are expressed in terms of comparisons to absolute threshold values.

Figure 8:
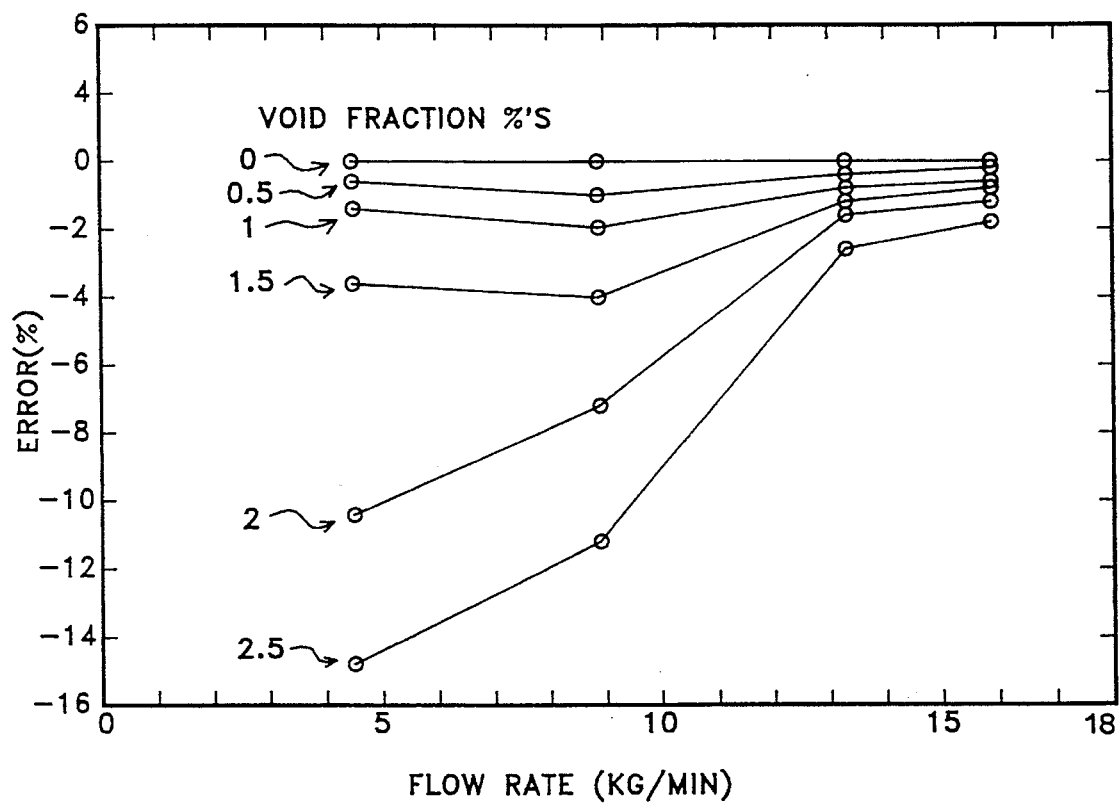
FIG. 8 is a graph which depicts the error percentage to be applied to measured mass flow rate to compute corrected mass flow rate.

FIG. 8 is a graph of information used in conjunction with information depicted in FIG. 6 to compute a corrected mass flow rate. The accuracy of the mass flow rate measured by mass flow instrumentation is adversely affected by increases in void fraction of the material flowing through flowmeter 10. Void fraction, as discussed above, indicates the content of lighter material, such as air, mixed with the material flowing through flowmeter 10. FIG. 6 shows the signature information which identifies an increasing void fraction as a function of frequency and drive power, specifically: linear rising frequency coupled with a positively curved increase in drive power.

In addition to other information discussed below, the signature information stored in ROM memory 202 includes an encoding of void fraction information depicted in the graph of FIG. 6. The void fraction information is used by the methods of the present invention to determine the current void fraction percentage as a function of measured frequency and drive power. The void fraction information of FIG. 6 is encoded into ROM memory, with the signature information, as coefficients of polynomial equations describing the curves of FIG. 6 or in a tabular form used to interpolate void fraction from frequency or drive power values. As described below with respect to FIG. 14, the void fraction information stored ROM memory 202 is used to compute the void fraction from frequency and drive power measurements. One skilled in the art will recognize that a tabular encoding of the functions represented in FIG. 6 is preferred for use with low cost microprocessors which may possess limited mathematical computational power.

Information shown in the graph of FIG. 8 is used to compute an error correction factor (error percentage) to be applied to the measured mass flow rate for determining a corrected mass flow rate. FIG. 8 shows six exemplary graphs of error percentage as a function of measured mass flow rate. Each of the six curves is labeled to indicate a corresponding computed void fraction determined, as discussed above, utilizing information shown in FIG. 6 and stored with signature information in ROM memory 202. For example, if void fraction is computed as above to be 1.5%, the curve on FIG. 8 labeled 1.5 is used to determine the error correction factor (error percentage) to be applied given a mass flow rate. Using the curve labeled 1.5 and the measured mass flow rate, the error percentage can be determined as shown in FIG. 8.

In addition to other information discussed below, the signature information stored in ROM memory 202 includes an encoding of the error percentage information depicted in the graph of FIG. 8. The error percentage information is used by the methods of the present invention to determine the current error percentage as a function of measured flow rate and computed void fraction. The error percentage information of FIG. 8 is encoded into ROM memory 202, with the signature information, as coefficients of polynomial equations describing the curves of FIG. 8 or in a tabular form used to interpolate error percentage from measured mass flow and computed void fraction values. As described below with respect to FIG. 14, the error percentage information stored in ROM memory 202 is used to compute the corrected mass flow. One skilled in the art will recognize that a tabular encoding of the functions represented in FIG. 8 is preferred for use with low cost microprocessors which may possess limited mathematical computational power.

Fault Signature Information Format

Signature threshold information is stored in ROM memory 202 of FIG. 2 for use by CPU 200 in comparing the current operational parameter values, slopes, and curves. The threshold information format is most easily understood when expressed as a data structure in a high level programming language such as "C". It is to be expressly understood that this expression is but one exemplary embodiment of the signature threshold information in ROM memory 202. Many equivalent forms of representing the reference threshold information are within the spirit and scope of the present invention. The threshold information expresses the nominal values of a properly operating flowmeter by defining the upper an lower limits of the several operational parameters, of the slopes of the operational parameters, and of the curvatures of the slopes. The limits are encoded for each of several faults conditions detectable by the methods of the present invention. If the current values of the parameters, their slopes, and their curvatures, are within the defined limits then the corresponding fault condition has not arisen.

```
struct reference_data {
    float NOMINALP;         /* nominal drive power */
                            /* for application */
    float NOMINALF;         /* nominal frequency for */
                            /* application */
    float MAXM;             /* maximum corrected */
                            /* mass flow */
    float MINM;             /* minimum corrected */
                            /* mass flow */
    struct crack_detection_info {
        /*
         * Cracks are indicated by positively curved increasing
         * drive power coupled with negatively curved decreasing
         * frequency.
         */
        float MAXP;         /* maximum drive power */
        float MINF;         /* minimum frequency */
        float MAXPSLOPE;    /* maximum drive power */
                            /* slope */
        float MINFSLOPE;    /* minimum frequency */
                            /* slope */
        float MAXPCURV;     /* maximum drive power */
                            /* curvature */
        float MINFCURV;     /* minimum frequency */
                            /* curvature */
    } CRACK;
    struct flow_correction_info {
        /*
         * Table describing signature curves of FIG. 6
         */
        float
        VOID_FRACTION[ ];   /* table to compute */
                            /* void fraction */
        /*
         * Table describing plot of
         * FIG. 8
         */
        float
        ERROR_PERCENT[ ];   /* table to compute error */
                            /* percent */
    } MASS_CORRECT;
    int NUMFAULTS;          /* number of other */
                            /* detectable faults */
    struct other_fault_info {
        /*
         * Each "other" detectable fault has the following fields
         * which may be set as appropriate for the particular
         * flowmeter application. For example if a MAXimum
         * parameter is not relevant to detection of a
         * particular fault, it is set to +INFINITY. Similarly if a
         * MINimum parameter is not needed it is set to
         * -INFINITY.
         */
        float MAXF;         /* maximum frequency */
        float MAXP;         /* maximum drive power */
        float MAXT;         /* maximum temperature */
        float MAXM;         /* maximum measured */
                            /* mass flow */
        float MINF;         /* minimum frequency */
        float MINP;         /* minimum drive power */
        float MINT;         /* minimum temperature */
        float MINM;         /* minimum measured */
                            /* mass flow */
        float MAXFSLOPE;    /* maximum frequency */
                            /* slope */
        float MAXPSLOPE;    /* maximum drive power */
                            /* slope */
        float MAXTSLOPE;    /* maximum temperature */
                            /* slope */
        float MAXMSLOPE;    /* maximum mass flow */
                            /* slope */
        float MINFSLOPE;    /* minimum frequency */
                            /* slope */
        float MINPSLOPE;    /* minimum drive power */
                            /* slope */
        float MINTSLOPE;    /* minimum temperature */
                            /* slope */
        float MINMSLOPE;    /* minimum mass flow */
                            /* slope */
        float MAXFCURV;     /* maximum frequency */
                            /* curvature */
        float MAXPCURV;     /* maximum drive power */
                            /* curvature */
        float MAXTCURV;     /* maximum temperature */
                            /* curvature */
        float MAXMCURV;     /* maximum mass flow */
                            /* curvature */
        float MINFCURV;     /* minimum frequency */
                            /* curvature */
        float MINPCURV;     /* minimum drive power */
                            /* curvature */
        float MINTCURV;     /* minimum temperature */
                            /* curvature */
        float MINMCURV;     /* minimum mass flow */
                            /* curvature */
        /*
         * If the fault represented by the above signature is
         * detected, then the following fields define the actions
         * to be taken with the pump, valve and panel display.
         */
        float PUMPCHANGE;   /* adjustment to pump */
                            /* speed to correct */
        float VALVECHANGE;  /* adjustment to valve */
                            /* to correct */
        char *DISPlAY;      /* message to display */
    } FAULT[MAXFAULTS];
} REF;
```

Fault Detection and Correction
Methods—Overview

Figure 9:
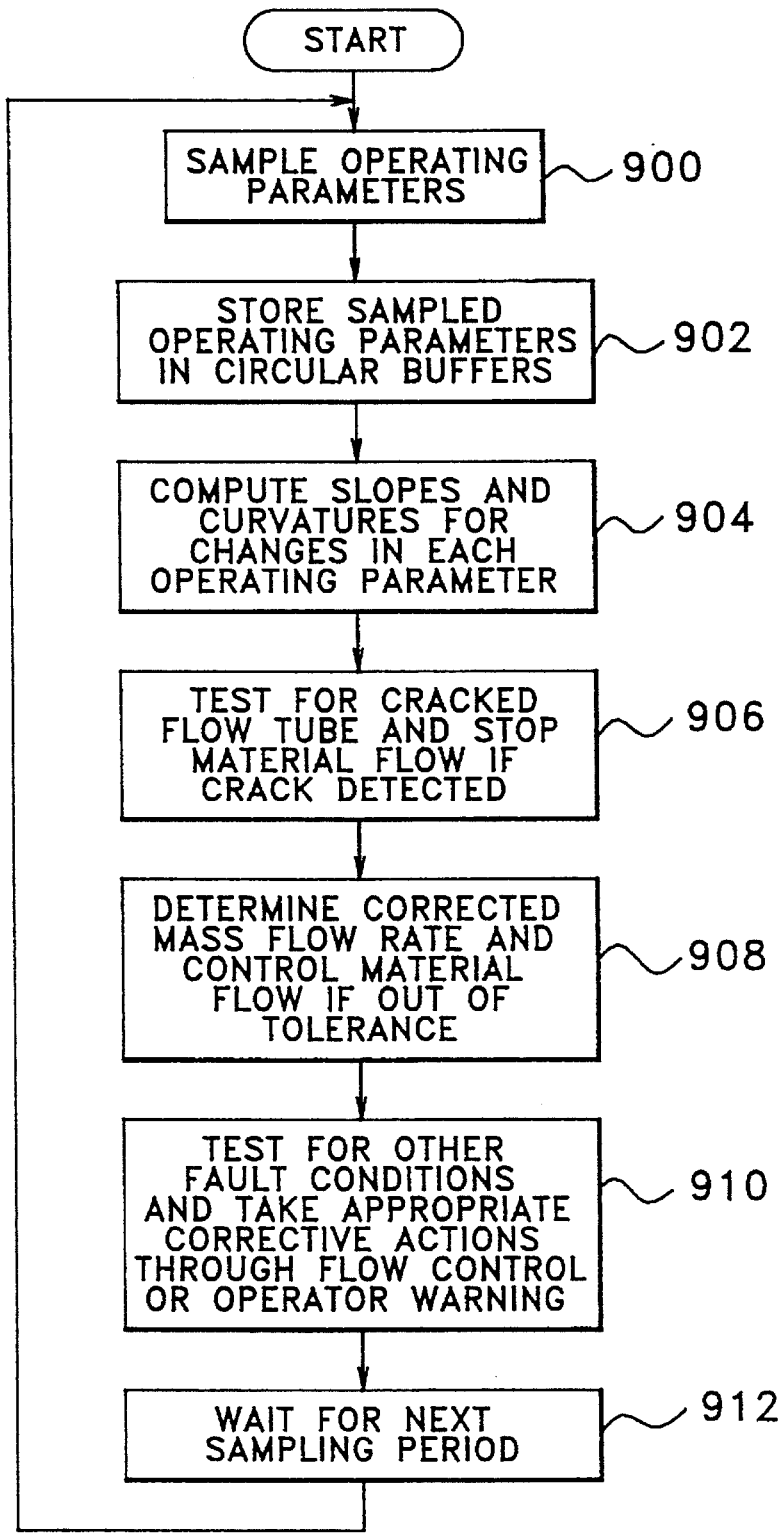
FIG. 9 is a flowchart depicting an overview of the steps comprising the method of the present invention.

The methods of the present invention utilize the signature information described above to detect and correct several fault conditions. FIG. 9 is a flowchart of the methods of the present invention. The elements of FIG. 9 describe the methods of the present invention at a high level. Later figures and associated descriptions below provide additional detail of the individual elements of FIG. 9.

Element 900 operates to acquire samples of the current operating parameters of flowmeter 10 in preparation for analysis of the flowmeter operation. Element 900 is described below in further detail with respect to FIG. 10.

Element 902 operates to store the samples acquired by element 900 in a circular buffer in RAM memory 201. Element 902 is described below in further detail with respect to FIG. 11.

Element 904 operates to compute the slope and curvature of changes in the operating parameters sampled by operation of element 900 and stored in RAM memory 201 by operation of element 902. The most recent samples plus previous samples stored in the circular buffer in RAM memory 201 are used to determine the slope and curvature of changes in the operational parameters over time. Element 904 is described below in further detail with respect to FIG. 12.

Element 906 operates to determine whether a crack is forming in flow tubes 12 and 14 of flowmeter 10. Element 906 analyzes the current sampled operating parameters and the slopes and curvatures computed in element 904 to detect the formation of a crack in flow tubes 12 and 14. If a crack is detected, element 906 operates to stop the flow of material through flowmeter 10 and to relieve the fluid pressure within the flow tubes 12 and 14. Element 906 is described below in further detail with respect to FIG. 13.

Element 908 operates to compute the corrected mass flow rate through flowmeter 10 by compensating the measured mass flow rate for the detected void fraction in the material flowing through flow tubes 12 and 14. If the corrected mass flow rate is found to be outside acceptable limits, element 908 operates to adjust the computed flow rate through flowmeter 10. Element 908 is described below in further detail with respect to FIG. 14.

Element 910 operates to compare the sampled operating parameters and the computed slopes and curvatures of changes in the operating parameters against corresponding signature information stored in ROM memory 202. If any fault signature information matches the corresponding measured or computed information, then the corrective actions described in ROM memory 202 along with the signature information are invoked to attempt correction of the problem and to notify an operator of the occurrence of the fault. Element 910 is described below in further detail with respect to FIG. 15.

Element 912 operates to delay execution of the methods of the present invention until the next sampling period. This assures the periodic sampling and analysis of the operating parameters of flowmeter 10. Processing of the method continue at element 900. This method periodically repeats processing of elements 900 through 912 to monitor operation of flowmeter 10 for purposes of detecting and correcting operating faults.

Fault Detection and Correction Methods—Sampling

Figure 10:
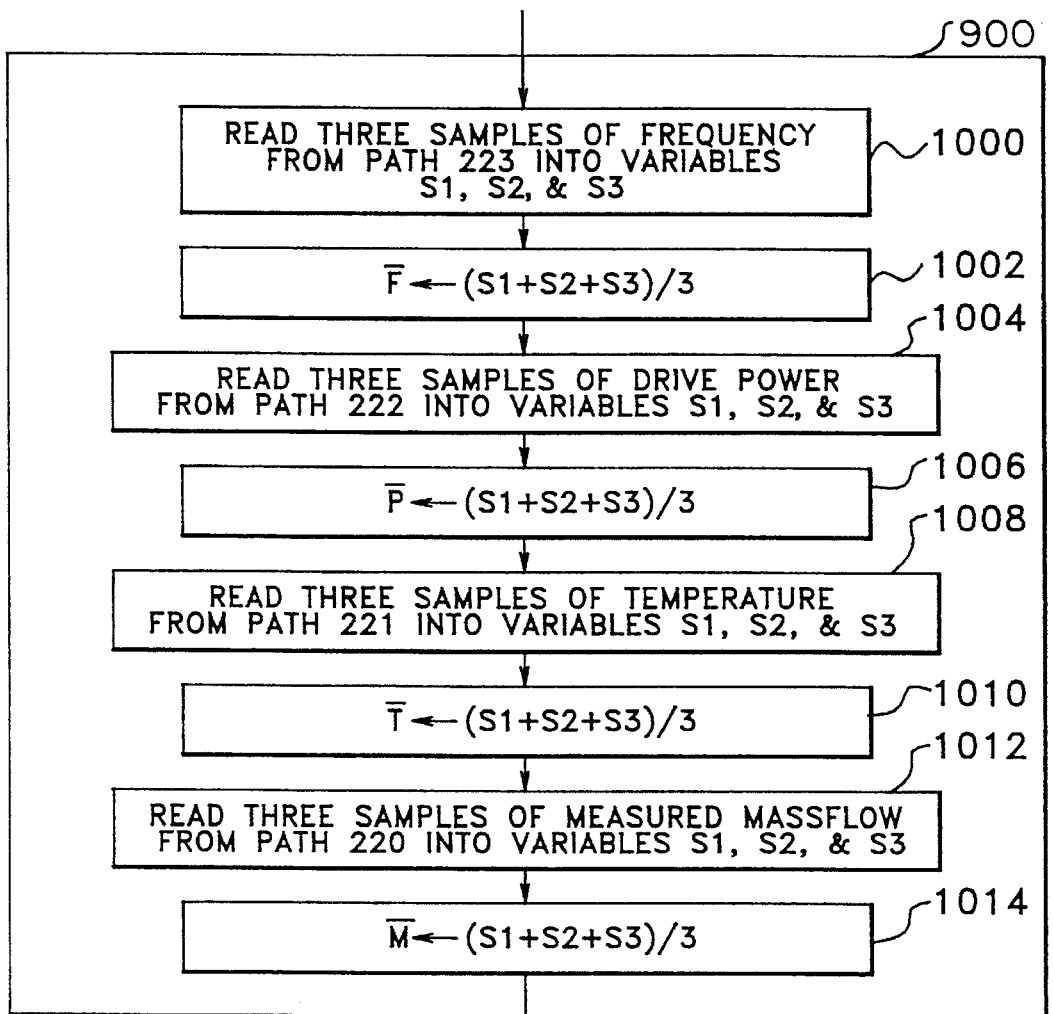
FIG. 10 is a flowchart depicting additional detail of the step of FIG. 9 for sampling operational parameters.

FIG. 10 is a flowchart depicting additional detail of the operation of element 900 described above. Elements of FIG. 10 operate to sample the operating parameters of flowmeter 10. Specifically, frequency, drive power, temperature, and measured mass flow are sampled by operation of the elements of FIG. 10 and stored in RAM memory 201 in variables named $\bar{F}$, $\bar{P}$, $\bar{T}$, and $\bar{M}$, respectively. Averaging of three consecutive readings helps to reduce the effects of noise in the analog signals received from mass flow instrumentation 24 over paths 160 through 163. Variables stored in RAM memory 201 named S1, S2, and S3 are used to temporarily store three consecutive readings of each sampled operational parameter.

Element 1000 operates to read three consecutive values of frequency from path 220 into variables S1, S2, and S3, respectively.

Element 1002 computes the average frequency value by adding variables S1, S2, and S3 and dividing the sum by 3. The average frequency is then stored in the variable $\bar{F}$ for further processing by subsequent elements.

Element 1004 operates to read three consecutive values of drive power from path 221 into variables S1, S2, and S3, respectively.

Element 1006 computes the average drive power value by adding variables S1, S2, and S3 and dividing the sum by 3. The average drive power is then stored in the variable $\bar{P}$ for further processing by subsequent elements.

Element 1008 operates to read three consecutive values of temperature from path 222 into variables S1, S2, and S3, respectively.

Element 1010 computes the average temperature value by adding variables S1, S2, and S3 and dividing the sum by 3. The average temperature is then stored in the variable $\bar{T}$ for further processing by subsequent elements.

Element 1012 operates to read three consecutive values of measured mass flow from path 223 into variables S1, S2, and S3, respectively.

Element 1014 computes the average measured mass flow value by adding variables S1, S2, and S3 and dividing the sum by 3. The average measured mass flow is then stored in the variable $\bar{M}$ for further processing by subsequent elements. This completes processing of the elements of FIG. 10 and therefor element 900 of FIG. 9. Processing continues with element 902 of FIG. 9.

Fault Detection and Correction Methods—Storing

Figure 11:
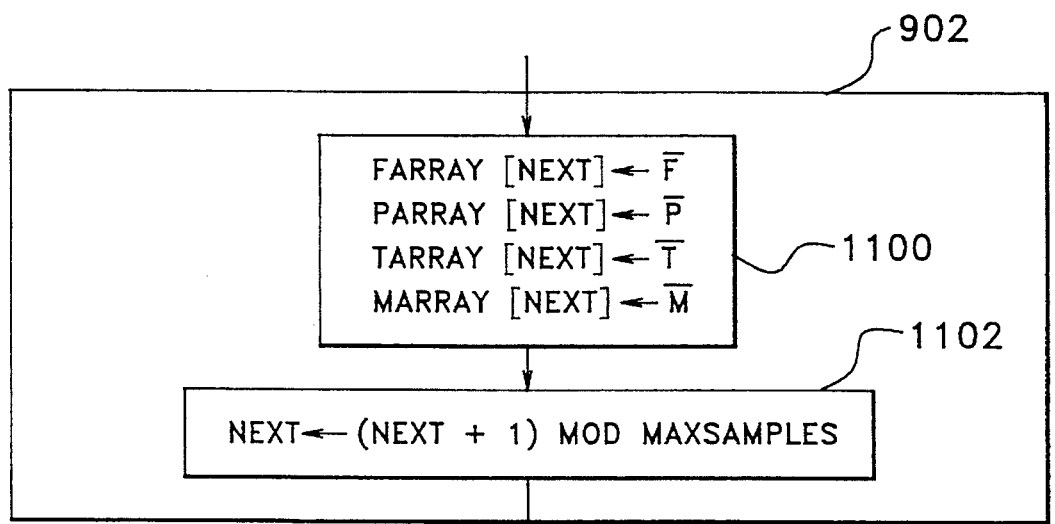
FIG. 11 is a flowchart depicting additional detail of the step of FIG. 9 for storing sampled operational parameters.

FIG. 11 is a flowchart depicting additional detail of the operation of element 902 described above. Specifically, elements of FIG. 11 store the averaged operational parameter values computed by operation of element 900 of FIG. 9 in circular buffers in RAM memory 201 of FIG. 2. The values stored for the current sample period and previous sample stored in circular buffers are used in subsequent elements for further processing.

Element 1100 operates to store the averaged operating parameter values determined by operation of element 900 of FIG. 9. NEXT is a variable stored in RAM memory 201 and is used as a circular index into parallel circular buffer arrays FARRAY, PARRAY, TARRAY, and MARRAY. The circular buffers are also stored in RAM memory 201. Specifically, $\bar{F}$, $\bar{P}$, $\bar{T}$, and $\bar{M}$ are each stored in an element of FARRAY, PARRAY, TARRAY, and MARRAY, respectively, indexed by the NEXT variable current value.

Element 1102 operates to increment the variable NEXT in a circular manner by applying a modulo function with MAXSAMPLES. MAXSAMPLES is the maximum number of samples to be stored in the circular buffer arrays discussed above in element 1100. This completes processing of the elements of FIG. 11 and therefor element 902 of FIG. 9. Processing continues with element 904 of FIG. 9.

Fault Detection and Correction Methods—Slope and Curvature Computations

Figure 12:
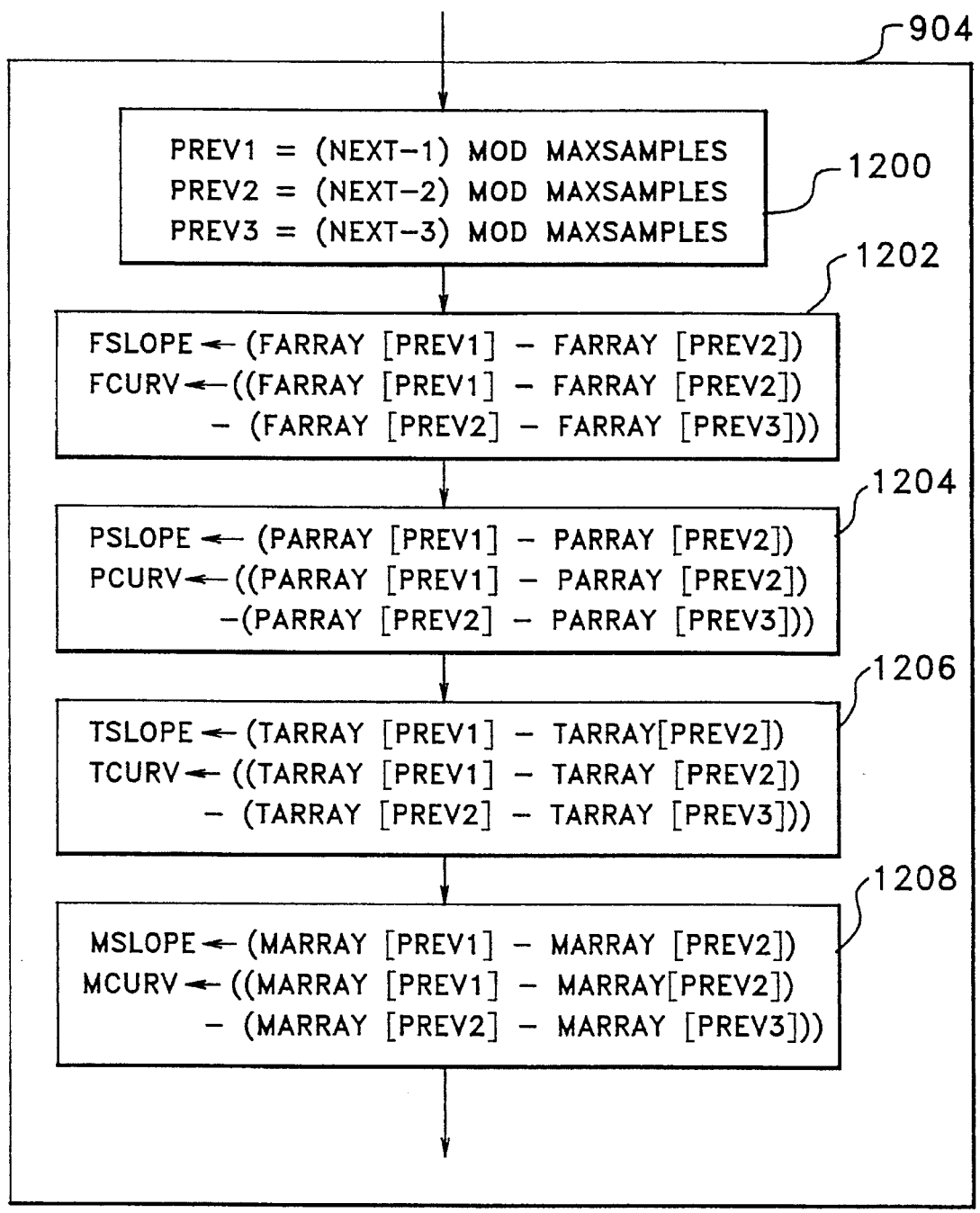
FIG. 12 is a flowchart depicting additional detail of the step of FIG. 9 for computing slopes and curvatures of changes in stored operational parameters.

FIG. 12 is a flowchart depicting additional detail of the operation of element 904 described above. Elements of FIG. 12 operate to compute the slope, (first derivative with respect to time), and the curvature, (second derivative with respect to time), for changes in each stored average operational parameter. The variables used to store the computed slope and curvature of changes in each operation parameter are stored in RAM memory 201. In addition, three temporary variables used to index into the circular buffers described above are stored in RAM memory 201.

Element 1200 computes indices into the circular buffer arrays FARRAY, PARRAY, TARRAY, and MARRAY for the past three average values stored in the circular buffers by operation of element 902 described above. Modulo arithmetic, as described above, is used to compute values for variables PREV1, PREV2, and PREV3, the indices into the circular buffers for the past three average values. PREV1, PREV2, and PREV3 are computed as the current value of NEXT minus 1, 2, and 3 respectively.

Element 1202 operates to compute the slope and curvature of changes in the stored averages of the frequency operational parameter. FSLOPE and FCURV are variables in RAM memory 201 of FIG. 2 in which the slope and curvature are stored. FSLOPE is computed as the difference between the last two average values of frequency stored in FARRAY[PREV1] and FARRAY[PREV2]. The time base for the rate of change of the operational parameter is presumed to be one unit of time equal to the sampling period used to sample the operational parameters as discussed above in element 912 of FIG. 9. FCURV is the difference between the computed slopes of the past two time periods. Specifically, FCURV is equal to:

(FARRAY[PREV1]–FARRAY[PREV2])–(FARRAY[PREV2]–FARRAY[PREV3])

Element 1204 operates to compute the slope and curvature of changes in the stored averages of the drive power operational parameter. PSLOPE and PCURV are variables in RAM memory 201 of FIG. 2 in which the slope and curvature are stored. PSLOPE is computed as the difference between the last two values of drive power stored in PARRAY[PREV1] and PARRAY[PREV2]. The time base for the rate of change of the operational parameter is presumed to be one unit of time equal to the sampling period used to sample the operational parameters as discussed above in element 912 of FIG. 9. PCURV is the difference between the computed slopes of the past two time periods. Specifically, PCURV is equal to:

(PARRAY[PREV1]–PARRAY[PREV2])–(PARRAY[PREV2]–PARRAY[PREV3])

Element 1206 operates to compute the slope and curvature of changes in the stored averages of the temperature operational parameter. TSLOPE and TCURV are variables in RAM memory 201 of FIG. 2 in which the slope and curvature are stored. TSLOPE is computed as the difference between the last two values of temperature stored in TARRAY[PREV1] and TARRAY[PREV2]. The time base for the rate of change of the operational parameter is presumed to be one unit of time equal to the sampling period used to sample the operational parameters as discussed above in element 912 of FIG. 9. TCURV is the difference between the computed slopes of the past two time periods. Specifically, TCURV is equal to:

(TARRAY[PREV1]–TARRAY[PREV2])–(TARRAY[PREV2]–TARRAY[PREV3])

Element 1208 operates to compute the slope and curvature of changes in the stored averages of the measured mass flow rate operational parameter. MSLOPE and MCURV are variables in RAM memory 201 of FIG. 2 in which the slope and curvature are stored. MSLOPE is computed as the difference between the last two values of measured mass flow rate stored in MARRAY[PREV1] and MARRAY[PREV2]. The time base for the rate of change of the operational parameter is presumed to be one unit of time equal to the sampling period used to sample the operational parameters as discussed above in element 912 of FIG. 9. MCURV is the difference between the computed slopes of the past two time periods. Specifically, MCURV is equal to:

(MARRAY[PREV1]–MARRAY[PREV2])–(MARRAY[PREV2]–MARRAY[PREV3])

This completes processing of the elements of FIG. 12 and therefor element 904 of FIG. 9. Processing continues with element 906 of FIG. 9.

Fault Detection and Correction Methods—Crack Detection

Figure 13:
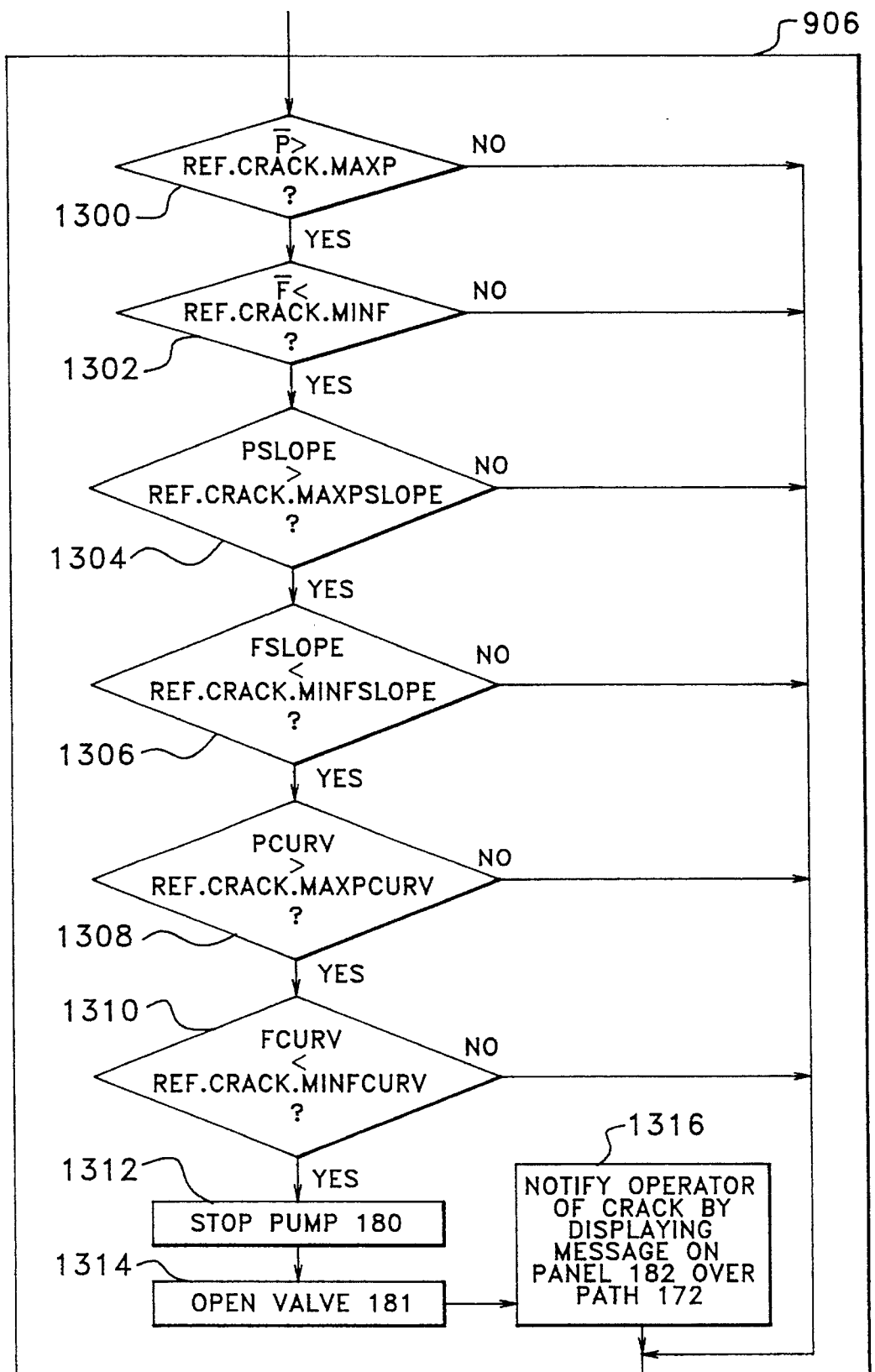
FIG. 13 is a flowchart depicting additional detail of the step of FIG. 9 which tests for a cracked flow tubes and stops material flow accordingly.

FIG. 13 is a flowchart depicting additional detail of the operation of element 906 described above. Elements of FIG. 13 operate to determine whether a crack is present in flow tubes 12 and 14 of flowmeter 10. A crack is detected by comparing the current sampled operational parameter values, computed slopes, and computed curvatures for frequency and drive power against signature information stored in ROM memory 202. REF.CRACK data structure described above contains the relevant limits for the particular flowmeter 10 in the particular application as shown in FIG. 1A. Positively curved increasing drive power coupled with negatively curved decreasing frequency is the signature of a crack in a flow tube 12 or 14.

Element 1300 operates to compare sampled drive power $\overline{P}$, computed by operation of element 900, with REF.CRACK.MAXP discussed above. This determines whether drive power has increased beyond a threshold value such that further tests are required to determine that a crack exists in a flow tube 12 or 14. If the sampled driver power has not yet reached the corresponding signature threshold value, there is no crack in flow tubes 12 and 14 and processing of the elements of FIG. 12 is complete. If no crack is present, processing of element 906 of FIG. 9 is complete and processing continues with element 908 of FIG. 9. Otherwise, further testing is require to determine whether a crack is present in flow tubes 12 and 14 and processing continues with element 1302.

Element 1302 operates to compare sampled frequency $\overline{F}$, computed by operation of element 900, with REF.CRACK.MINF discussed above. This determines whether frequency has decreased beyond a threshold value such that further tests are required to determine that a crack exists in flow tube 12 and 14. If the sampled frequency has not yet reached the corresponding signature threshold value there is no crack in flow tubes 12 and 14 and processing of the elements of FIG. 12 is complete. If no crack is present, processing of element 906 of FIG. 9 is complete and processing continues with element 908 of FIG. 9. Otherwise, further testing is required to determine whether a crack is present in flow tubes 12 and 14 and processing continues with element 1304.

Element 1304 operates to compare the computed slope of changes in drive power PSLOPE, computed by operation of element 904, with REF.CRACK.MAXPSLOPE discussed above. This determines whether drive power slope has increased beyond a threshold value such that further tests are required to determine that a crack exists in a flow tube 12 or 14. If the driver power slope has not yet reached the corresponding signature threshold value there is no crack in flow tubes 12 and 14 and processing of the elements of FIG. 12 is complete. If no crack is present, processing of element 906 of FIG. 9 is complete and processing continues with element 908 of FIG. 9. Otherwise, further testing is require to determine whether a crack is present in flow tubes 12 and 14 and processing continues with element 1306.

Element 1306 operates to compare the computed slope of changes in frequency FSLOPE, computed by operation of element 900, with REF.CRACK.MINFSLOPE discussed above. This determines whether frequency slope has decreased beyond a threshold value such that further tests are required to determine that a crack exists in a flow tube 12 or 14. If the frequency slope has not yet reached the corresponding signature threshold value there is no crack in flow tubes 12 and 14 and processing of the elements of FIG. 12 is complete. If no crack is present, processing of element 906 of FIG. 9 is complete and processing continues with element 908 of FIG. 9. Otherwise, further testing is require to determine whether a crack is present in a flow tubes 12 or 14 and processing continues with element 1308.

Element 1308 operates to compare the computed curvature of changes in drive power PCURV, computed by operation of element 904, with REF.CRACK.MAXPCURV discussed above. This determines whether drive power curvature has increased beyond a threshold value such that further tests are required to determine that a crack exists in flow tube 12 and 14. If the drive power curvature has not yet reached the corresponding signature threshold value there is no crack in flow tubes 12 and 14 and processing of the elements of FIG. 12 is complete. If no crack is present, processing of element 906 of FIG. 9 is complete and processing continues with element 908 of FIG. 9. Otherwise, further testing is require to determine whether a crack is present in flow tubes 12 and 14 and processing continues with element 1310.

Element 1310 operates to compare the computed curvature of changes in frequency FCURV, computed by operation of element 900, with REF.CRACK.MINFCURV discussed above. This determines whether frequency curvature has decreased beyond a threshold value such that further tests are required to determine that a crack exists in flow tube 12 and 14. If the frequency curvature has not yet reached the corresponding signature threshold value there is no crack in flow tubes 12 and 14 and processing of the elements of FIG. 12 is complete. If no crack is present, processing of element 906 of FIG. 9 is complete and processing continues with element 908 of FIG. 9. Otherwise, a crack is present in flow tubes 12 and 14 and processing continues with element 1312.

Element 13 12 operates to stop pump 180 by applying an appropriate signal to path 170. Stopping pump 180 will stop the flow of material through flow tubes 12 and 14 to reduce the possibility of releasing material through the crack in flow tubes 12 and 14.

Element 1314 operates to open valve 181 by applying an appropriate signal to path 171. Opening valve 181 reduces back pressure in flowmeter 10 to further reduce the possibility of releasing material through the crack in flow tubes 12 and 14.

Element 13 16 operates to notify an operator of the existence of a crack in flow tubes 12 and 14 of flowmeter 10. An appropriate message is applied to path 172 to be displayed on panel 182. This completes processing of the elements of FIG. 13 and therefor element 906 of FIG. 9. Processing continues with element 908 of FIG. 9.

Fault Detection and Correction Methods—Mass Flow Rate Correction

Figure 14:
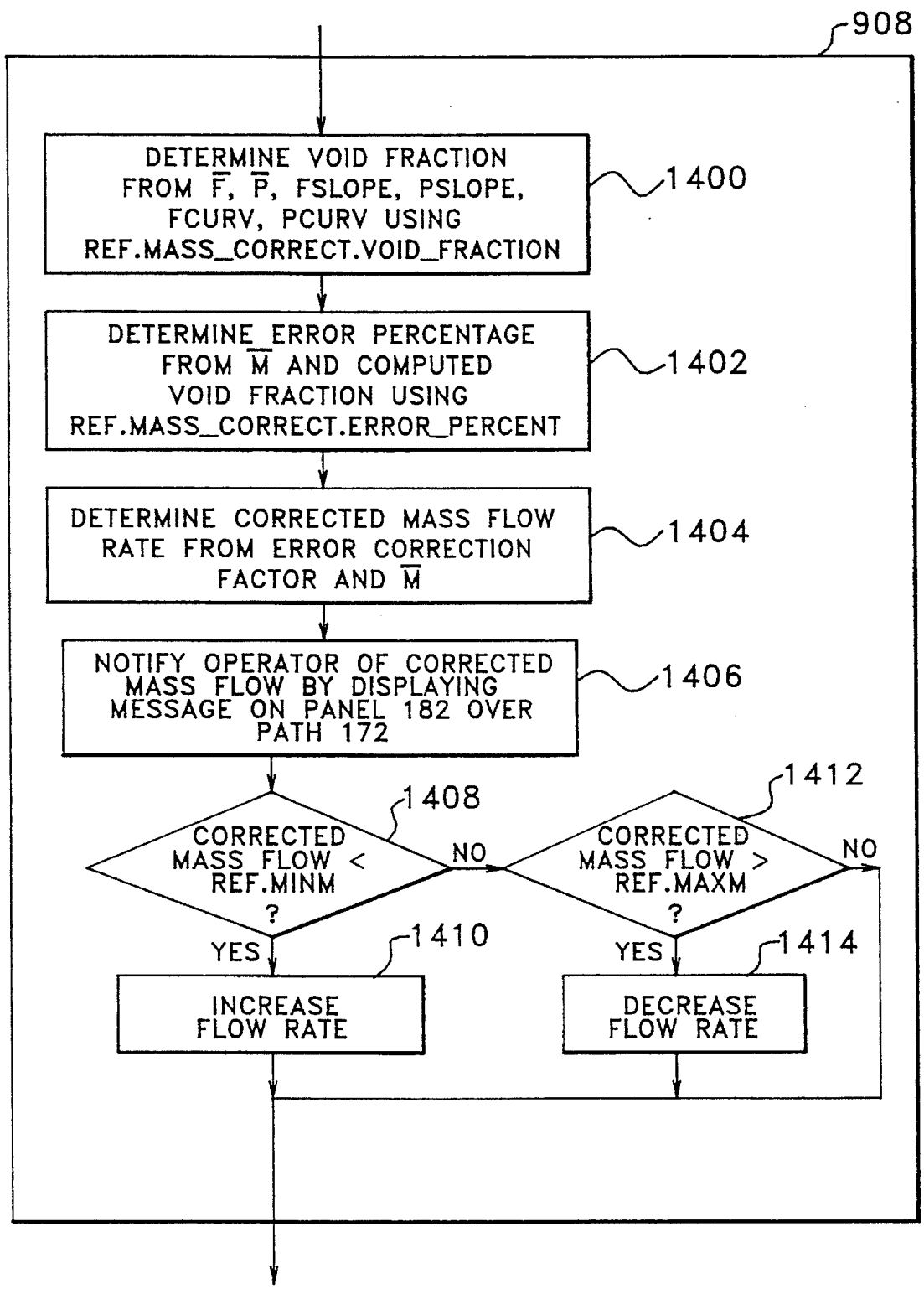
FIG. 14 is a flowchart depicting additional detail of the step of FIG. 9 which computes void fraction corrected mass flow rate and adjusts material flow accordingly.

FIG. 14 is a flowchart depicting additional detail of the operation of element 908 described above. Elements of FIG. 14 operate to compute the corrected mass flow rate through flowmeter 10. The corrected mass flow rate is adjusted by an error factor (error percentage) determined from the measured mass flow rate and a computed void fraction of the material flowing through flow tubes 12 and 14. Void fraction is determined as a function of sampled frequency and sampled drive power as depicted in FIG. 6 and as discussed above. Error percentage is determined as a function of the computed void fraction and the measured mass flow provided by mass flow instrumentation 24 as discussed above with respect to FIG. 8. The error percentage is then applied to the measured mass flow rate to determine the corrected mass flow rate. The information shown in FIGS. 6 and 8 is encoded in ROM memory 202 as discussed above for use in determining void fraction and error percentage to correct the measured mass flow rate. REF.MASS_CORRECT.VOID_FRACTION is the encoding of the information stored in ROM memory 202 and shown in FIG. 6 used for computing void fraction as a function of measured frequency and drive power. REF.MASS_CORRECT.ERROR_PERCENT is the encoding of the information stored in ROM memory 202 and shown in FIG. 8 used for computing error percent as a function of measured mass flow rate and computed void fraction.

Use of corrected mass flow rate enables more precise measurement under a wider range of process conditions.

Element 1400 operates to determine the void fraction for the material flowing through flowmeter 10. Void fraction is determined as a function of $\bar{F}$, $\bar{P}$, FSLOPE, PSLOPE, FCURV, and PCURV, all determined by operation of elements 900 and 904 discussed above, used in conjunction with the information depicted in FIG. 6 and encoded in ROM memory 202 as REF.MASS_CORRECT.VOID_FRACTION. As discussed above, the information in ROM memory 202 may be encoded in tabular form or as coefficients of a polynomial equation used to determine void fraction. Tabular form is preferred for low cost microprocessors such as CPU 200 of FIG. 2 with limited computational capabilities. The current values of $\bar{F}$, $\bar{P}$, FSLOPE, and PSLOPE are used to interpolate in the table of entries stored at REF.MASS_CORRECT.VOID_FRACTION in ROM memory 202 to determine the current void fraction of the material flowing within flowmeter 10.

Element 1402 operates to determine the error percent to be applied to correct the measured mass flow rate of flowmeter 10. Error percent is determined as a function of $\bar{M}$, determined by operation of element 900 discussed above, and the void fraction, computed above by element 1400, used in conjunction with the information depicted in FIG. 8 and encoded in ROM memory 202 as REF.MASS_CORRECT.ERROR_PERCENT. As discussed above, the information in ROM memory 202 may be encoded in tabular form or as coefficients of a polynomial equation used to determine void fraction. Tabular form is preferred for low cost microprocessors such as CPU 200 of FIG. 2 with limited computational capabilities. The current values of $\bar{M}$ and the void fraction determined by operation of element 1400 above are used to interpolate in the table of entries stored at REF.MASS_CORRECT.ERROR_PERCENT in ROM memory 202 to determine the current error percentage for correcting the measured mass flow rate of material flowing within flowmeter 10.

Element 1404 operates to determine the corrected mass flow rate from $\overline{M}$ and the computed error percentage determined by operation of element 1402 discussed above. The error percentage is applied to the measured mass flow rate to correct for the effects of void fraction on the measured mass flow rate.

Element 1406 operates to notify the operator of the corrected mass flow rate by displaying a message on panel 182 sent over path 172.

Element 1408 compares the corrected mass flow rate, determined by operation of element 1406, with a nominal threshold minimum flow rate stored in ROM memory 202 at REF.MINM, as discussed above. If the corrected mass flow rate is below the threshold value, processing continues with element 1410. Otherwise, processing continues with element 1412.

Element 1410 operates to increase the mass flow rate by increasing the speed of pump 180 and by opening valve 181. CPU 200 of FIG. 2 controls pump 180 and valve 181 by applying signals to paths 170 and 171 respectively. This completes processing of the elements of FIG. 14 and therefor element 908 of FIG. 9. Processing continues with element 910 of FIG. 9.

Element 1412 compares the corrected mass flow rate, determined by operation of element 1406, with a nominal threshold maximum flow rate stored in ROM memory 202 at REF.MAXM, as discussed above. If the corrected mass flow rate is above the threshold value, processing continues with element 1414. Otherwise, this completes processing of the elements of FIG. 14, and therefor element 908 FIG. 9, and processing continues with element 910 of FIG. 9.

Element 1414 operates to decrease the mass flow rate by decreasing the speed of pump 180 and closing valve 181. CPU 200 of FIG. 2 controls pump 180 and valve 181 by applying signals to paths 170 and 171 respectively. This completes processing of the elements of FIG. 14 and therefor element 908 of FIG. 9. Processing continues with element 910 of FIG. 9.

Fault Detection and Correction Methods—Other Fault Detection and Correction

Figure 15:
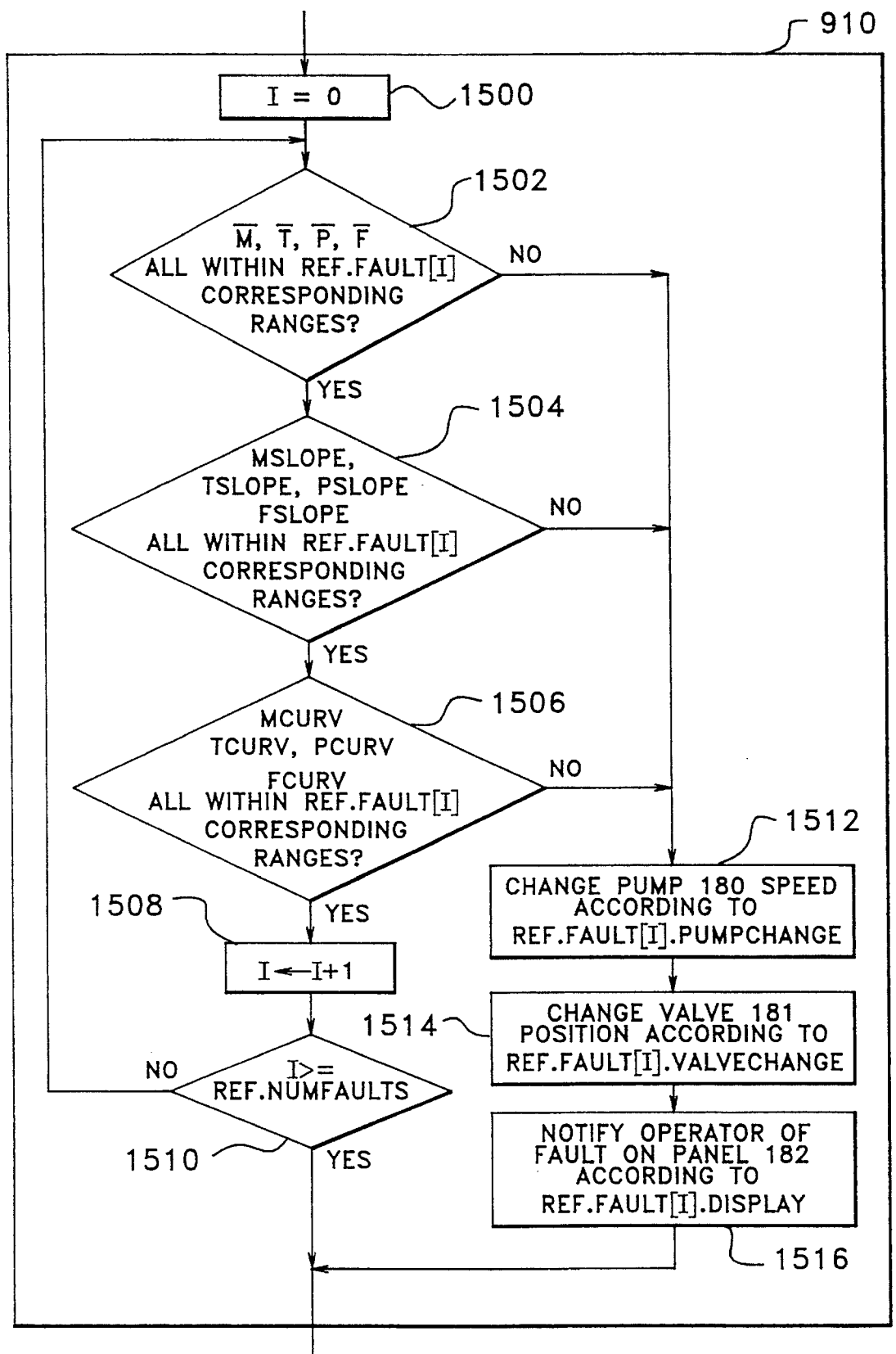
FIG. 15 is a flowchart depicting additional detail of the step of FIG. 9 which tests for other operating fault conditions and controls mass flow rate accordingly.

FIG. 15 is a flowchart depicting additional detail of the operation of element 910 described above. Elements of FIG. 15 operate to detect other operating fault conditions in flowmeter 10. As discussed above, signature information for each detectable fault condition is stored in ROM memory 202 encoded as high and low threshold values for each sampled operating parameter as well as high and low threshold values for the associated computed slope and curvature of changes in each corresponding operational parameter. The number of other fault conditions detectable by the methods of the present invention are stored in ROM memory 202 in REF.NUMFAULTS as discussed above. The signature information for all detectable fault conditions is stored in the array of structures REF.FAULT[] as discussed above.

One skilled in the art will recognize that detection of a crack in flow tubes 12 and 14 of flowmeter 10 as discussed above with reference to FIG. 13, is an example of a fault detectable under operation of the general fault detection methods described herein with respect to FIG. 15. Crack detection is separately addressed above with reference to FIG. 13 to help clarify the precise method of detecting a crack under the methods of the present invention. The threshold values encoded in REF.CRACK may be similarly encoded as one of the faults detectable by operation of the methods of FIG. 15 and encoded in ROM memory 202 within REF.FAULT.

Element 1500 operates to initialize to zero a loop counting variable, named I, stored in RAM memory 201. I is used in subsequent elements to determine when processing of all detectable fault conditions is completed.

Element 1502 operates to compare each sampled operating parameter to its corresponding high and low threshold value encoded and stored in ROM memory 202. Specifically, $\overline{M}$ is compared to REF.FAULT[I].MINM and to REF.FAULT[I].MAXM. In like manner, $\overline{P}$, $\overline{F}$, and $\overline{T}$ are each compared to their respective minimum and maximum threshold values, namely: REF.FAULT[I].MINP, REF.FAULT[I].MAXP, REF.FAULT[I].MINF, REF.FAULT[I].MAXF, REF.FAULT[I].MINT, and REF.FAULT[I].MAXT. If any comparison indicates that any one of the sampled operating parameters is outside the specified range, the corresponding fault has occurred and processing continues with element 1512. Otherwise, processing continues with element 1504.

Element 1504 operates to compare the computed slope of the change in each sampled operating parameter to its corresponding high and low threshold value encoded and stored in ROM memory 202. Specifically, MSLOPE is compared to REF.FAULT[I].MINMSLOPE and to REF.FAULT[I].MAXMSLOPE. In like manner, PSLOPE, FSLOPE, and TSLOPE are each compared to their respective minimum and maximum threshold values, namely: REF.FAULT[I].MINPSLOPE, REF.FAULT[I].MAXPSLOPE, REF.FAULT[I].MINFSLOPE, REF.FAULT[I].MAXFSLOPE, REF.FAULT[I].MINTSLOPE, and REF.FAULT[I].MAXTSLOPE. If any comparison indicates that any one of computed slopes is outside the specified range, the corresponding fault has occurred and processing continues with element 1512. Otherwise, processing continues with element 1506.

Element 1506 operates to compare the computed curvature of the change in each sampled operating parameter to its corresponding high and low threshold value encoded and stored in ROM memory 202. Specifically, MCURV is compared to REF.FAULT[I].MINMCURV and to REF.FAULT [I].MAXMCURV. In like manner, PCURV, FCURV, and TCURV are each compared to their respective minimum and maximum threshold values, namely: REF.FAULT[I].MINPCURV, REF.FAULT[I].MAXPCURV, REF.FAULT[I].MINFCURV, REF.FAULT[I].MAXFCURV, REF.FAULT[I].MINTCURV, and REF.FAULT[I].MAXTCURV. If any comparison indicates that any one of the computed curvatures is outside the specified range, the corresponding fault has occurred and processing continues with element 15 12. Otherwise, processing continues with element 1508.

Element 1508 operates to increment loop counter I by one to prepare for testing the next fault condition described in the REF.FAULT[] array of encoded signature information.

Element 15 10 operates to compare loop counter I to REF.NUMFAULTS. If I has not yet reached the number of faults encoded in the REF.FAULT[] array, then processing continues with element 1502 to process another fault signature encoded in ROM memory 202. Otherwise, this completes processing of the elements of FIG. 15 and therefor element 910 of FIG. 9. Processing continues with element 912 of FIG. 9.

Element 1512 operates to change the speed of pump 180 according to the percentage value in REF.FAULT[I] .PUMPCHANGE. The speed of pump 180 is changed by CPU 200 applying an appropriate signal on path 170. The change in speed of pump 180 is intended to alter the mass flow rate of material in flowmeter 10 in order to correct the detected fault condition encoded in REF.FAULT[I].

Element 15 14 operates to change the position of valve 181 according to the percentage value in REF.FAULT[I] .VALVECHANGE. The position of valve 181 is changed by CPU 200 applying an appropriate signal on path 171. The change in the position of valve 181 is intended to alter the mass flow rate of material in flowmeter 10 in order to correct the detected fault condition encoded in REF.FAULT[I].

Element 1516 operates to display a message on panel 181 indicating the occurrence of the detected fault condition. The message to be displayed is retrieved from the value in REF.FAULT[I].DISPLAY. The message is displayed on panel 182 by CPU 200 applying an appropriate signals on path 172. This completes processing of the elements of FIG. 15 and therefor element 910 of FIG. 9. Processing continues with element 912 of FIG. 9.

It is expressly understood that the claimed invention is not to be limited to the description of the preferred embodiment but encompasses other modifications and alterations within the scope and spirit of the inventive concept. In particular, the methods and apparatus of the present invention may be applied to Coriolis effect mass flowmeters with a variety of tube shapes including so called "U" shaped tubes, straight tubes, and others. In addition, the information and data shown on the graphs of FIGS. 3 through 8 represent measurements made on a plurality of flowmeters, at different times, and under different operating conditions. The data from one graph of FIGS. 3 through 8 therefore cannot be meaningfully compared to the data of another graph. There are many variables involved in determining flowmeter data output. Among these variables are: thickness of the flow tube walls, material temperature, viscosity, and flowrate; elastic properties of the material comprising the flow tubes; etc. Therefore, the data shown on each of these figures is only illustrative and should be used only to portray the relationships between the various parameters shown on the same graph. Because of the many variables involved, it cannot be assumed that the numerical values shown will be readily reproduced by others.

We claim:

1. A method for detecting abnormal operating conditions in an operating Coriolis effect mass flowmeter comprising the steps of:

measuring the values of operating parameters of said operating Coriolis effect mass flowmeter, wherein said operating parameters include the vibration frequency of said operating Coriolis effect mass flowmeter and the drive power of said operating Coriolis effect mass flowmeter;

selecting at least one value selected from the group consisting of the measured values of said operating parameters, slopes of said measured values of said operating parameters, and curvatures of said measured values of said operating parameters;

determining that said at least one value has deviated from a nominal value by a predetermined amount indicative of an occurrence of one of said abnormal operating conditions;

generating an output signal indicating said occurrence of said one of said abnormal operating conditions in response to said determination that said at least one value has deviated from a nominal value by said predetermined amount; and applying said output signal to utilization means for purposes including the correction of said one of said abnormal operating condition in said flowmeter.

2. The method of claim 1 wherein said step of applying said output signal to said utilization means comprises controlling a pump associated with said flowmeter to alter the flow rate of material flowing through said flowmeter.

3. The method of claim 1 wherein said step of applying said output signal to said utilization means comprises controlling a valve associated with said flowmeter to alter the flow rate of material flowing through said flowmeter.

4. The method of claim 1 wherein:

said nominal value of said slope of said measured values of said vibration frequency is greater than substantially zero;

said nominal value of said slope of said measured values of said drive power is less than substantially zero;

said nominal value of said curvature of said measured values of said vibration frequency is greater than substantially zero;

said nominal value of said curvature of said measured values of said drive power is less than substantially zero; and said output signal indicates the presence of a crack in flow tubes of said flowmeter.

5. The method of claim 4 wherein said step of applying said output signal to said utilization means comprises controlling a pump associated with said flowmeter to stop material from flowing through said flowmeter.

6. The method of claim 4 where said step of applying said output signal to said utilization means comprises controlling a valve associated with said flowmeter to stop material from flowing through said flowmeter.

7. The method of claim 1 wherein:

said nominal value of said slope of said measured values of said vibration frequency is greater than substantially zero;

said nominal value of said slope of said measured values of said drive power is substantially zero;

said nominal value of said curvature of said measured values of said vibration frequency is less than substantially zero; and said output signal indicates the presence of an unacceptable density change in material flowing in flow tubes of said flowmeter.

8. The method of claim 1 wherein:

said nominal value of said slope of said measured values of said vibration frequency is less than substantially zero;

said nominal value of said slope of said measured values of said drive power is less than substantially zero;

said nominal value of said curvature of said measured values of said vibration frequency is substantially zero;

said nominal value of said curvature of measured values of said drive power is less than substantially zero; and said output signal indicates the presence of an unacceptable void fraction in material flowing in flow tubes of said flowmeter.

9. The method of claim 1 wherein:

said nominal value of said slope of said measured values of said vibration frequency is greater than substantially zero;

said nominal value of said slope of measured values of said drive power is less than substantially zero;

said nominal value of said curvature of said measured values of said vibration frequency is substantially zero;

said nominal value of said curvature of said measured values of said drive power is substantially zero; and said output signal indicates the presence of an unacceptable mass fraction in material flowing in flow tubes of said flowmeter.

10. A method for detecting cracks in the flow tubes of an operating Coriolis effect mass flowmeter, said method comprising the steps of:

generating a signal indicative of the present vibration frequency of said flow tubes of said operating Coriolis effect mass flowmeter;

generating a signal indicative of present drive power required to drive said flow tubes of said Coriolis effect mass flowmeter to vibrate at said present vibration frequency;

determining that said signal indicative of present vibration frequency is below a vibration frequency nominal value by a predetermined amount;

determining that said signal indicative of present drive power is above a drive power nominal value by a predetermined amount; and generating an output signal indicating the presence of a crack in said flow tubes in response to said determination that said present vibration frequency is below said vibration frequency nominal value and in response to said determination that, concurrently, said present drive power is above said drive power nominal value.

11. The method of claim 10 further comprising the step of:

applying said output signal to a pump associated with said flowmeter to stop the flow of material flowing through said flowmeter.

12. The method of claim 10 further comprising the step of:

applying said output signal to a valve associated with said flowmeter to stop the flow of material flowing through said flowmeter.

13. The method of claim 10 further comprising the steps of:

determining a vibration frequency slope value of the rate of change of said present vibration frequency with respect to time;

determining a drive power slope value of the rate of change of said present drive power with respect to time;

determining that said vibration frequency slope value is below a vibration frequency slope nominal value by a predetermined amount;

determining that said drive power slope value is above a drive power slope nominal value by a predetermined value; and generating said output signal indicating the presence of a crack in said flow tubes in response to said determination that said vibration frequency slope value is below said vibration frequency slope nominal value and in response to said determination that, concurrently, said drive power slope value is above said drive power slope nominal value.

14. The method of claim 13 further comprising the steps of:

determining a vibration frequency curvature value of the rate of change of said vibration frequency slope value with respect to time;

determining a drive power curvature value of the rate of change of said drive power slope value with respect to time;

determining that said vibration frequency curvature value is below a vibration frequency curvature nominal value by a predetermined amount;

determining that said drive power curvature value is above a drive power curvature nominal value by a predetermined amount; and generating said output signal indicating the presence of a crack in said flow tubes in response to said determination that said vibration frequency curvature value is below said vibration frequency curvature nominal value and in response to said determination that, concurrently, said drive power curvature value is above said drive power curvature nominal value.

15. The method of claim 1 wherein said abnormal operating conditions further include an unacceptable density change in the material flowing through said operating Coriolis effect mass flowmeter, wherein said output signal indicates the presence of an unacceptable density change in the material flowing through said operating Coriolis effect mass flowmeter.

16. The method of claim 15 further comprising the step of:

applying said output signal to a pump associated with said flowmeter to alter the flow of material flowing through said flowmeter.

17. The method of claim 15 further comprising the step of:

applying said output signal to a valve associated with said flowmeter to alter the flow of material flowing through said flowmeter.

18. The method of claim 15 further comprising the steps of:

determining a vibration frequency slope value of the rate of change of said present vibration frequency with respect to time;

determining a drive power slope value of the rate of change of said present drive power with respect to time;

determining that said vibration frequency slope value is below a vibration frequency slope nominal value by a predetermined amount;

determining that said drive power slope value differs from a drive power slope nominal value by a predetermined amount; and generating said output signal indicating the presence of an unacceptable density change in the material flowing said flowmeter in response to said determination that said vibration frequency slope value is below said vibration frequency slope nominal value and in response to said determination that, concurrently, said drive power slope value differs from said drive power slope nominal value.

19. The method of claim 18 further comprising the steps of:

determining a vibration frequency curvature value of the rate of change of said vibration frequency slope value with respect to time;

determining a drive power curvature value of the rate of change of said drive power slope value with respect to time;

determining that said vibration frequency curvature value is above a vibration frequency curvature nominal value by a predetermined amount;

determining that said drive power curvature value differs from a drive power nominal value by a predetermined amount; and generating said output signal indicating the presence of an unacceptable density change in the material flowing through said flowmeter in response to said determination that said vibration frequency curvature value is above said vibration frequency curvature nominal value and in response to said determination that, concurrently, said drive power curvature differs from said drive power curvature nominal value.

20. The method of claim 1 wherein said abnormal operating conditions include an unacceptable void fraction in the material flowing through said operating Coriolis effect mass flowmeter, wherein said output signal indicates the presence of an unacceptable void fraction in the material flowing through said operating Coriolis effect mass flowmeter.

21. The method of claim 20 further comprising the step of:

applying said output signal to a pump associated with said flowmeter to alter the flow of material flowing through said flowmeter.

22. The method of claim 20 further comprising the step of:

applying said output signal to a valve associated with said flowmeter to alter the flow of material flowing through said flowmeter.

23. The method of claim 20 further comprising the steps of:

determining a vibration frequency slope value of the rate of change of said present vibration frequency with respect to time;

determining a drive power slope value of the rate of change of said present drive power with respect to time;

determining that said vibration frequency slope value is above a vibration frequency slope nominal value by a predetermined amount;

determining that said drive power slope value is above a drive power slope nominal value by a predetermined amount; and generating said output signal indicating the presence of a an unacceptable void fraction in the material flowing through said flowmeter in response to said determination that said vibration frequency slope value is above said vibration frequency slope nominal value and in response to said determination that, concurrently, said drive power slope value is above said drive power slope nominal value.

24. The method of claim 23 further comprising the steps of:

determining a vibration frequency curvature value of the rate of change of said vibration frequency slope value with respect to time;

determining a drive power curvature value of the rate of change of said drive power slope value with respect to time;

determining that said vibration frequency curvature value differs from a vibration frequency curvature nominal value by a predetermined amount;

determining that said drive power curvature value is above a drive power curvature nominal value by a predetermined amount; and generating said output signal indicating the presence of an unacceptable void fraction in the material flowing through said flowmeter in response to said determination that said vibration frequency curvature value differs from said vibration frequency curvature nominal value and in response to said determination that, concurrently, said drive power curvature value is above said drive power curvature nominal value.

25. The method of claim 1 wherein said abnormal operating conditions include an unacceptable mass fraction in the material flowing through said operating Coriolis effect mass flowmeter, wherein said output signal indicates the presence of an unacceptable mass fraction in the material flowing through said operating Coriolis effect mass flowmeter.

26. The method of claim 25 further comprising the step of:

applying said output signal a pump associated with said flowmeter to alter the flow of material flowing through said flowmeter.

27. The method of claim 25 further comprising the step of:

applying said output signal to a valve associated with said flowmeter to alter the flow of material flowing through said flowmeter.

28. The method of claim 25 further comprising the steps of:

determining a vibration frequency slope value of the rate of change of said present vibration frequency with respect to time;

determining a drive power slope value of the rate of change of said present drive power with respect to time;

determining that said vibration frequency slope value is below a vibration frequency slope nominal value by a predetermined amount;

determining that said drive power slope value is above a drive power slope nominal value by a predetermined amount; and generating said output signal indicating the presence of a an unacceptable mass fraction in the material flowing through said flowmeter in response to said determination that said vibration frequency slope value is below said vibration frequency slope nominal value and in response to said determination that, concurrently, said drive power slope value is above said drive power slope nominal value.

29. The method of claim 28 further comprising the steps of:

determining a vibration frequency curvature value of the rate of change of said vibration frequency slope value with respect to time;

determining a drive power curvature value of the rate of change of said drive power slope value with respect to time;

determining that said vibration frequency curvature value differs from a vibration frequency curvature nominal value by a predetermined amount;

determining that said drive power curvature value differs from a drive power curvature nominal value by a predetermined amount; and generating said output signal indicating the presence of an unacceptable mass fraction in the material flowing through said flowmeter in response to said determination that said vibration frequency curvature value differs from said vibration frequency curvature nominal value and in response to said determination that, concurrently, said drive power curvature value differs from said drive power curvature nominal value.

30. The method of claim 1 wherein said abnormal operating conditions further includes an unacceptable void fraction in the material flowing through said operating Coriolis effect mass flowmeter, said method further comprising the steps of:

generating a signal indicative present measured mass flow rate of said operating flowmeter;

determining a void fraction value of material flowing through said flow tubes as a function of said at least one value;

determining an error correction factor as a function of said present measured mass flow rate and said void fraction value;

determining a corrected mass flow rate using said present measured mass flow rate and said error correction factor; and applying an output signal proportional to the difference between said corrected mass flow rate and said present measured mass flow rate to utilization means for altering the rate of flow of material flowing through said flowmeter.

31. The method of claim 30 wherein said step of determining said void fraction value further comprises interpolating within a table of values to determine said void fraction value as a function of said present vibration frequency.

32. The method of claim 30 wherein said step of determining said void fraction value further comprises interpolating within a table of values to determine said void fraction value as a function of said present drive power.

33. The method of claim 30 wherein said step of determining said error correction factor comprises interpolating within a table to determine said error correction factor as a function of said present measured mass flow rate and of said void fraction value.

34. An apparatus for detecting a fault condition in an operating Coriolis effect mass flowmeter, said apparatus comprising:

input means connected to said Coriolis effect mass flowmeter for receiving information including measured values regarding present operating parameters of said Coriolis effect mass flowmeter, wherein said information includes the vibration frequency of said Coriolis effect mass flowmeter and the drive power of said Coriolis effect mass flowmeter;

means for selecting at least one value selected from the group consisting of values of present operating parameters of said Coriolis mass flowmeter, slopes of said values of said present operating parameters, and curvatures of said values of said present operating parameters;

memory means for storing fault signature information regarding at least one fault condition represented by said present operating parameters;

output means for indicating the occurrence of said fault condition in operation of said Coriolis mass flowmeter; and detection means connected to said input means and connected to said output means and connected to said memory means, for comparing said at least one value to said fault signature information to detect the occurrence of said fault condition and to apply a signal to said output means indicating the occurrence of said fault condition.

\* \* \* \* \*